US012789476B2

(12) United States Patent
Boztepe et al.

(10) Patent No.: US 12,789,476 B2
(45) Date of Patent: Nov. 10, 2026

(54) POLYMER MATRIX COMPOSITE JOINTS, SYSTEMS AND METHODS FOR PROCESSING POLYMER MATRIX COMPOSITE JOINTS

(71) Applicant: The Boeing Company, Arlington, VA (US)

(72) Inventors: Sinan Boztepe, Gdansk (PL); Phillip J. Crothers, Hampton East (AU)

(73) Assignee: The Boeing Company, Arlington, VA (US)

( * ) Notice: Subject to any disclaimer, the term of this patent is extended or adjusted under 35 U.S.C. 154(b) by 31 days.

(21) Appl. No.: 18/956,584

(22) Filed: Nov. 22, 2024

(65) Prior Publication Data

US 2026/0145393 A1 May 28, 2026

(51) Int. Cl.
*B29C 65/34* (2006.01)
*B29C 65/00* (2006.01)

(52) U.S. Cl.
CPC ...... *B29C 65/3492* (2013.01); *B29C 65/3468* (2013.01); *B29C 66/71* (2013.01); *B29C 66/91221* (2013.01); *B29C 66/91421* (2013.01)

(58) Field of Classification Search
CPC . B29C 65/3492; B29C 65/3468; B29C 65/76; B29C 66/71
See application file for complete search history.

(56) References Cited

U.S. PATENT DOCUMENTS 10,099,458 B2 10/2018 Haq et al.
11,438,973 B2 9/2022 Kessler
11,607,852 B2 3/2023 Dando et al.
2007/0295933 A1* 12/2007 Kanba ................ G03G 15/2003 252/71
2019/0160759 A1 5/2019 Vazquez Castro et al.
2021/0061663 A1 3/2021 Carlsson
(Continued)

FOREIGN PATENT DOCUMENTS

EP 3809600 4/2021
WO 2013190252 12/2013

OTHER PUBLICATIONS

European Patent Office, Extended European Search Report, App. No. 25211280.0 (Apr. 9, 2026).
(Continued)

*Primary Examiner* — Daniel Mcnally
(74) *Attorney, Agent, or Firm* — Walters & Wasylyna LLC

(57) ABSTRACT

Polymer matrix composite joints include a first contact area of a first polymer matrix composite structure, a second contact area of a second polymer matrix composite structure and a resistive film heating element. The resistive film heating element includes a lignin-based carbonaceous material. The resistive film heating element defines a longitudinal form and is disposed between the first contact area and the second contact area. The resistive film heating element sized and shaped based on the first contact area and the second contact area. The resistive film heating element for joining the first polymer matrix composite structure and the second polymer matrix composite structure at the first contact area and the second contact area using a resistive welding process. Systems for processing polymer matrix composite joints and methods for processing polymer matrix composite joints are also disclosed.

20 Claims, 28 Drawing Sheets

(56) References Cited

U.S. PATENT DOCUMENTS

2023/0211569 A1* 7/2023 Mitrovic ............ B29C 65/3644 156/273.9
2024/0025127 A1 1/2024 Dubreuil

OTHER PUBLICATIONS

Stavrov et al: Resistance Welding of Thermoplastic Composites—an Overview, Composites Part A, Applied Science and Manufacturing, vol. 36, Issue 1, pp. 39-54 (Jan. 2005).
Lionetto et al: "Hybird Welding of Carbon-Fibre Reinforced Epoxy Based Composites," ECCM17—17th European Conference on Composite Materials, Munich, Germany (Jun. 26-30, 2016).
Premium AEROTEC, https;//www.premium-aerotec.com/.
Endrass et al: "Resistance Welding of Low-Melt Polyaryletherketone: Process Definition and Optimization," Composites Meet Sustainability—Proceedings of the 20th European Conference on Composite Materials, ECCM20, Lausanne, Switzerland (Jun. 26-30, 2022).
Eveno et al: "Resistance Welding of Graphite Polyetheretherketone Composites: An Experimental Investigation," Journal of Thermoplastic Composite Materials, (Oct. 1, 1988).
Janas et al: "Rapid Electrothermal Response of High-Temperature Carbon Nanotube Film Heaters," Carbon, vol. 59, pp. 457-463 (Aug. 2013).
Brassard et al: "Resistance Welding of Thermoplastic Composites with a Nanocomposite Heating Element," Composites Part B: Engineering, vol. 165. pp. 779-784 (May 15, 2019).
European Commission: Cordis—EU Research Results, Emerging Printed Electronics Research Infrastructure (EMERGE), https://cordis.europa.eu/project/id/101007871/reporting.
Yao et al: "Recent Advances in Lignin-Based Carbon Mateials and Their Applications: A Review," International Journal of Biological Macromolecules, vol. 223, Part A, pp. 980-1014 (Dec. 31, 2022).
Suzuki et al: "Electrically Conducting Films Prepared From Graphite and Lignin in Pure Water," Front Bioeng Biotechnol (Nov. 8, 2022).
Sacchetti et al: "Effect of Resin-Rich Bond Line Thickness and Fibre Migration on the Toughness of Unidirectional Carbon/PEEK Joints," Composites Part A: Applied Science and Manufacturing, vol. 109, pp. 197-206 (2018).
Martin et al: "A Degree of Bonding Evolution Study of Co-Consolidated PEEK/PEI Composite Materials During Welding," Proceedings of the 23rd International Conference on Composite Materials, Belfast (2023).
Kim et al: "Heating Characteristics of Films Prepared with Polymer-Graphite Composites," International Journal of Polymer Science, vol. 2019 (Aug. 19, 2019).
Li et al: "Consolidation of aerospace-grade high-temperature thermoplastic carbon fiber composites via nano-engineered electrothermal heating," Composites Part B, vol. 262 (May 22, 2023).
Vertuccio et al: "Effective de-icing using graphene-based flexible heater," Composites Part B, vol. 162, pp. 600-610 (Jan. 8, 2019).
Luo et al: "Fabrication of Lignin-Based Nano Carbon Film Copper Foil Composite with Enhanced Thermal Conductivity," Nanomaterials (Nov. 25, 2019).
Haanappel et al: "Formability analyses of uni-directional and textile reinforced thermoplastics," Composites: Part A, vol. 56, pp. 80-92 (Sep. 24, 2013).
Xu et al: "In-situ curing of glass fiber reinforced polymer composites via resistive heating of carbon nanotube films," Composite Science and Technology, vol. 149, pp. 20-27 (Jun. 3, 2017).
Dominik Durr: "Simulation of the thermoforming process of UD fiber-reinforced thermoplastic tape laminates," KIT Scientific Publishing (Oct. 11, 2019).
Lee et al: "Advanced carbon fiber composite out-of-autoclave laminate manufacture via nanostructured out-of-oven conductive curing," Composites Science and Technology, vol. 166, pp. 150-159 (Feb. 26, 2018).

* cited by examiner

POLYMER MATRIX COMPOSITE JOINTS, SYSTEMS AND METHODS FOR PROCESSING POLYMER MATRIX COMPOSITE JOINTS

FIELD

The present disclosure relates generally to polymer matrix composite joints and, particularly, to systems and methods for processing polymer matrix composite joints. The processing of polymer matrix composite joints uses a resistive film heating element and a resistive welding process to join polymer matrix composite structures. The resistive film heating element includes a lignin-based carbonaceous material. In one example, the polymer matrix composite structures are thermoplastic composite structures. In another example, the polymer matrix composite structures include thermoset composite structures. Systems and methods for de-welding the polymer matrix composite structures are also disclosed.

BACKGROUND

Other emerging thermal joining technologies, such as ultrasonic and induction welding, require a welding apparatus or equipment positioned at certain distances close to the joint interface. This makes it difficult to implement these methods in practice for welding of thick composites parts and/or parts in complex geometrical shapes, such as closed-forms of composite box sections. Although existing welding technologies using nanomaterial-dispersed thermoplastic heaters provides further weight reduction at welded joints, and potentially reduce process time and energy, the repetitiveness of the process efficiency and the consistent welding quality may be questionable. This is because the nanomaterials dispersed into a polymer matrix create a random electrical percolation network which is often difficult to control during process resulting to have a heater element having different electrical and thermal conductive parameters. Resistive welding tests performed on multi-walled carbon nanotubes dispersed in a thermoplastic heater elements that included polyethylenimine revealed non-uniform heating over the weld area. Existing resistive heating technologies majorly use fossil-based nanomaterials which are relatively expensive and made of finite sources. Moreover, the existing technologies on welding of thermoset composites proposes solutions employing ultrasonic welding or induction welding, or electromagnetic excitation based on electromagnetic induction, microwave heating.

Accordingly, those skilled in the art continue with research and development efforts to improve resistive welding and de-welding techniques for joining polymer matrix composite structures, such as thermoplastic composite structures or thermoset composite structures, using resistive film heating elements that include lignin-based carbonaceous materials.

SUMMARY

Disclosed are examples of polymer matrix composite joints, systems and methods for processing polymer matrix composite joints. The following is a non-exhaustive list of examples, which may or may not be claimed, of the subject matter according to the present disclosure.

In an example, a polymer matrix composite joint includes a first contact area of a first polymer matrix composite structure, a second contact area of a second polymer matrix composite structure and a resistive film heating element. The resistive film heating element includes a lignin-based carbonaceous material. The resistive film heating element defines a longitudinal form and is disposed between the first contact area and the second contact area. The resistive film heating element sized and shaped based on the first contact area and the second contact area. The resistive film heating element for joining the first polymer matrix composite structure and the second polymer matrix composite structure at the first contact area and the second contact area using a resistive welding process.

In an example, a system for processing a polymer matrix composite joint includes a polymer matrix composite workpiece and an electric power source. The polymer matrix composite workpiece includes a polymer matrix composite joint. The electric power source with a power line connected to a first electrical connection on the polymer matrix composite joint and a return line connected to a second electrical connection on the polymer matrix composite joint.

In another example, a system for processing a polymer matrix composite joint includes a polymer matrix composite workpiece. The polymer matrix composite workpiece includes a polymer matrix composite joint.

In an example, method for processing a polymer matrix composite joint includes: (1) identifying a first polymer matrix composite structure and a second polymer matrix composite structure to be joined using resistive welding; (2) placing a resistive film heating element on the first polymer matrix composite structure over a first contact area of the first polymer matrix composite structure, the resistive film heating element including a lignin-based carbonaceous material and defining a longitudinal form; and (3) placing the second polymer matrix composite structure on the resistive film heating element such that a second contact area of the second polymer matrix composite structure is aligned with the first contact area of the first polymer matrix composite structure, the first contact area, the resistive film heating element and the second contact area defining a stack for the resistive welding at the polymer matrix composite joint.

In another example, a method for processing a polymer matrix composite joint includes: (1) identifying a polymer matrix composite joint to be separated using resistive de-welding, the polymer matrix composite joint including a first contact area of a first polymer matrix composite structure, a second contact area of a second polymer matrix composite structure, and a resistive film heating element including a lignin-based carbonaceous material, the resistive film heating element defining a longitudinal form and disposed between the first contact area and the second contact area; (2) connecting a power line from an electric power source to a first electrical connection at a proximal end of the resistive film heating element; and (3) connecting a return line from the electric power source to a second electrical connection at a distal end of the resistive film heating element.

Other examples of the disclosed polymer matrix composite joints, systems and methods for processing polymer matrix composite joints will become apparent from the following detailed description, the accompanying drawings and the appended claims.

DETAILED DESCRIPTION

Figure 1:
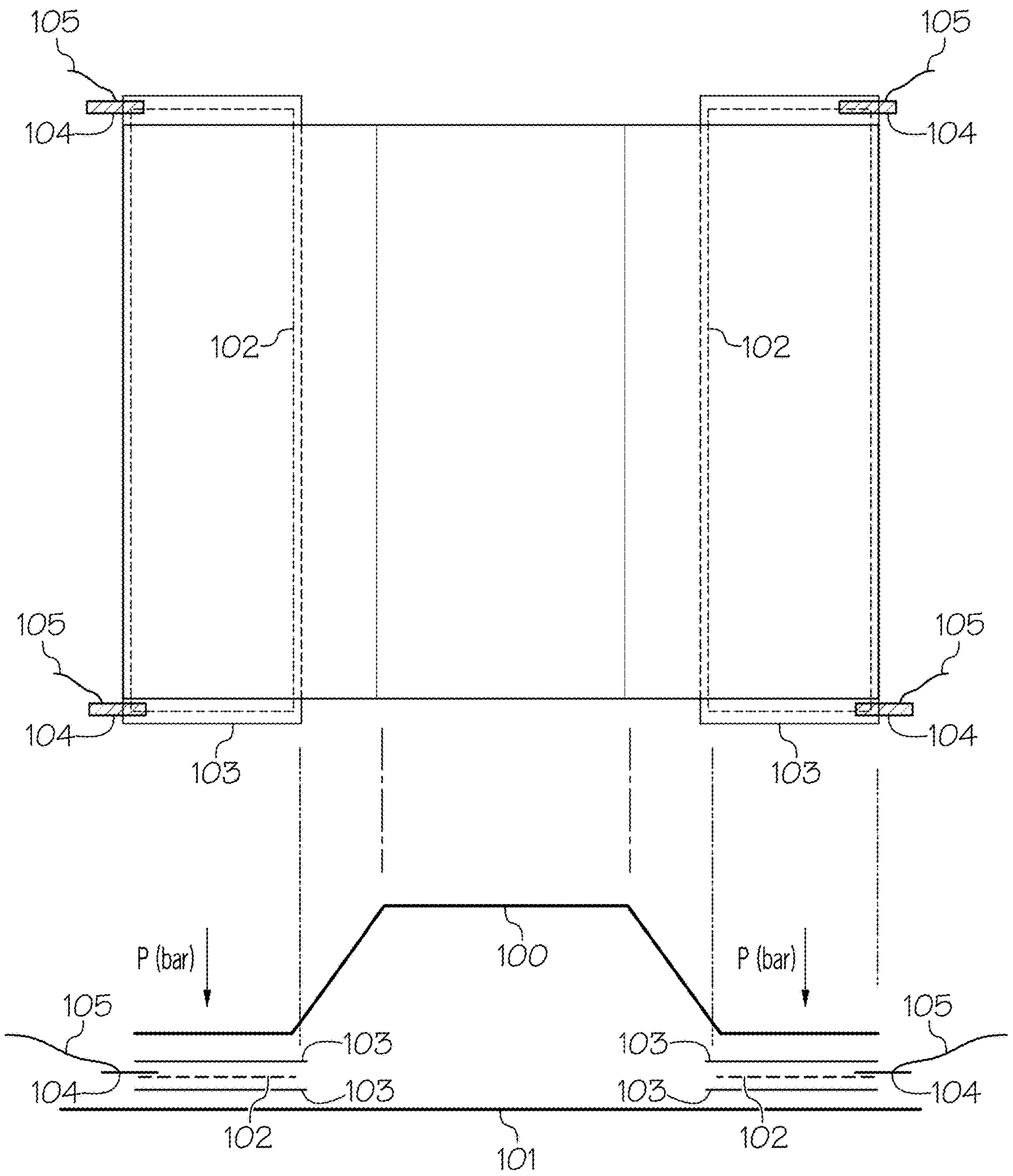
FIG. 1 provides top and exploded side views of an example of a polymer matrix composite joint.

The various examples of polymer matrix composite joints 200, systems 600, 800 for processing polymer matrix composite joints 200, and methods 1000, 1100, 1200, 1300, 1400, 1500, 1600, 1700, 1800, 1900, 2000, 2100, 2200, 2300, 2400, 2500, 2600 for processing polymer matrix composite joints 200 disclosed herein provide techniques using a resistive film heating element 210 to weld and de-weld a first contact area 202 of a first polymer matrix composite structure 204 to a second contact area of a second polymer matrix composite structure 208. The resistive film heating element 210 includes lignin-based carbonaceous material 212. In one example, the first and second polymer matrix composite structures 204, 208 include thermoplastic composite structures 226, 228. In another example, the first polymer matrix composite structure 204 and the second polymer matrix composite structure 208 include thermoset composite structures 502, 505.

The reversible assembling/disassembling method of thermoset and thermoplastic composites disclosed herein, for example, may use lignin-based graphite or graphene films as heater elements for resistive welding and de-welding processes. The method aims to improve some existing features and/or alleviates some of the drawbacks of previous methods. For example, methods disclosed herein may offer superior welding quality obtained through relatively more uniform heat dissipation with reduced operational costs and electrical power input for welding and de-welding process. The lignin-based graphite or graphene films may provide higher energy efficiency and in-plane heat dissipation thanks to superior electrical and thermal conductivity in comparison to conventional resistive welding heater elements such as metallic mesh, carbon fiber fabric or fossil-based nanomaterials.

The methods may offer greater cost reduction in initial investment on welding using, for example, lignin-based graphene or graphite resistive heater elements in comparison to already existing nanomaterial-based heater element solutions such as conventional graphene and carbon nanotube. For example, lignin can be less expensive and readily available in abundant supply from paper industry. The reversibility methods disclosed herein enable disassembly of end-of-life composite structures, which may reduce logistics and recycling costs, especially for large-scale welded structures which are often difficult to transport or handle for recycling. Additionally, the methods may result in little or no damage to the disassembled end-of-life composite structures, which may be further used for a recycling process to obtain intact reinforced fibers.

The methods may offer reversible assembling/disassembling both for thermoplastic composites and thermoset composites which extends applicability of resistive welding and de-welding technology. For reversible assembling/disassembling of thermoset composite joints, a lignin-based film heater is sandwiched between thermoplastic films and integrated into a thermoset joint for welding and de-welding of the thermoset composites based on separating the joint at the thermoplastic films. The assembling/disassembling methods disclosed herein facilitate the recycling process of composites and leverage further sustainable solutions to reduce the carbon footprint of each indirectly-related industrial step. In addition, usage of bio-derived materials as heater elements for welding may also impact positively on the carbon footprint of product development. This might be a contributing factor to reach net-zero carbon emission goal by 2050 in aviation industry.

Technical objectives and characteristics of the assembling and disassembling processes are divided into two cases: (1) assembly of, for example, thermoset or thermoplastic composites via resistive welding and (2) disassembly of, for example, thermoset or thermoplastic composites via resistive de-welding.

Case 1—Assembly of thermoset or thermoplastic composites via resistive welding.

The resistive welding process is one of the thermal joining methods, offering physical fusion bonding between thermoplastic parts thanks to their molecular structures. At the joint interface of the two thermoplastic pieces, heat is generated using a so-called heating element, or resistive heaters, where an electric power source is connected to film heaters using electrodes so that heat generation occurs when an electric current passing through a conductive network of the film heaters. During the welding process, typically a uniform pressure is applied simultaneously to secure bonding between the parts to be joined through achieving intimate contact between the surfaces at the weld interface, and facilitating autohesion, or molecular diffusion of polymer chains, between the parts to be joined.

With reference to FIG. 1, an example of the assembling method is described in relation to an omega-shaped airframe stiffener 100 and a fuselage skin 101 through a resistive welding process. The upper portion of FIG. 1 provides a top view of the joint. The lower portion of FIG. 1 provides an exploded side view of the joint. The assembling method incorporates the omega-shaped airframe stiffener 100 and a fuselage skin 101, both of which are made of fiber-reinforced polymer composites (for example, a unidirectional carbon fiber reinforced composite). Two pieces of lignin-based graphite or graphene resistive film heaters 102 are positioned between the fuselage skin 101 and the flanges of the omega-shaped stiffener 100. The resistive film heater 102 may be made of a blend of thermoplastic polymer and lignin-based graphite or graphene flakes (e.g., a blend of lignin-based graphene and polyvinyl alcohol) to increase flexibility of the film heater for adjusting it to any geometry depending on the shape and size requirements for the joint interface. The type of blending polymer and weight ratio of a polymer and graphene or graphite flakes of the resistive film heater 102 may vary regarding the required process temperature for welding. Lignin-based graphite or graphene resistive film heaters 102 may also be sandwiched with thin thermoplastic films 103 (e.g., having a thickness between 20-100 μm) for resistive welding of thermoplastic and/or thermoset composites. Adding an extra thermoplastic layer at the interface will likely increase the thickness of the joint. Adding thermoplastic films (up to 100 μm) at the joint interface may help to improve interlaminar mechanical properties of the joint by introducing resin-rich layer at the interface. In cases of assembling carbon fiber reinforced composites, the additional resin-rich layer may help to avoid a common problem of resistive welding, so called current leakage which may happen due to excessive transverse squeeze flow of molten thermoplastic under pressure exposing electrically conductive carbon fiber to be in direct contact with the graphene. Therefore, the method adds an additional thermoplastic film 103 to sandwich the heating elements 102, nevertheless the usage of additional thermoplastic film 103 may be opted out for successful resistive welding of thermoplastic composites. For assembling thermoset composites via resistive welding, the heating elements 102 are required to be sandwiched between thermoplastic films 103 to secure an optimal bonding at the joint. Prior to the resistive welding process, the heating elements 102 may be sandwiched between the thermoplastic films 103 and consolidated (e.g., via press consolidation) in a separate step. This may be done to shape the heater elements into a desired geometry concerning the geometrical complexity of the joint interface, to reduce gas volatiles and moisture entrapped in resin-rich polymer, and to control thickness of the sandwiched heating element 102 which is subsequently used for an assembling step via resistive welding.

Another aspect is to secure uniform in-plane heating on the welding zone without causing polymer degradation, neither in polymer matrix of the parts 100, 101 to be welded, nor in the graphene or graphite-based heating elements 102 (in cases in which they are blended with thermoplastics), nor in the thermoplastic films 103. Degradation and/or chemical decomposition in the polymer matrix of any element at the joint may reduce joint strength. Hence, thermoplastic films 103, and the thermoplastic polymer which may be blended into the resistive film heaters 102 may be chosen regarding the melting temperature of the composite parts 100, 101 to be welded. More specifically, the melting temperature of the added thermoplastics may be equal to or lower than the melting and/or processing temperature of the welded composite parts 100, 101. For example, for welding thermoset-based composites, thermoplastic films 103 may be made of linear low-density polyethylene, polypropylene, or polyvinyl alcohol, typically having a melting temperature equal to or lower than the processing temperature of advanced thermoset composites (e.g., typically lower than 200° C.).

As illustrated in the side view of FIG. 1, the length of the heating element 102 may be slightly shorter (e.g., several millimeters) than the thermoplastic films 103 to prevent any direct contact between the heating element and the composite parts 100, 101 to avoid any potential electric current leak in cases where at least one of the composite parts 100, 101 contains conductive fibers (e.g., carbon fibers). The top view of FIG. 1 shows an example in which the length of the heating elements 102 is slightly longer (e.g., several millimeters) than the length (denoted as “L” in the figure) of the stiffener 100 to secure the accessibility to the conductive electrodes 104. The conductive electrodes 104 may be made of copper (e.g., a copper mesh). A direct current power source can be connected to the heating elements 102 using electric cables or wires 105, and conductive electrodes 104 which are attached on both the ends of each resistive film heater 104. In cases where there is a high electric contact resistance between the electrodes 104 and the heating elements 102, a conductive adhesive (e.g., a conductive silver adhesive) may be applied between the heating elements 102 and the electrodes 104. The maximum operating temperature of the conductive adhesive is compatible with operating temperatures expected for the heating elements 102.

During the welding process through resistive heating, the heating elements 102 may heat the joint interface up to a desired temperature allowing the start of intimate contact between the joint surfaces and molecular diffusion of the thermoplastics. A uniform and constant pressure over the flange area of the omega-shaped stiffener may also be applied simultaneously (denoted as "P (bar)"). Pressure may be applied using an automatized apparatus (e.g., a robot head) or a rigid tool (e.g., a metallic tool).

Case 2—Disassembly of thermoset or thermoplastic composites via resistive de-welding.

The technical objectives and concerns for the disassembling method of thermoset and/or thermoplastic composites may be different than the assembling method. One of the main concerns of the disassembling method proposed here may be separating the welded end-of-service-life structures without damaging the welded parts. This may eventually enable obtaining a higher amount of intact fibers through a recycling process. In addition, this may also result in better valorizing of the parts which may be recycled and/or directly used in other industries.

In Case 2, the disassembling method is described to disassemble the welded parts that are assembled in the assembling method of Case 1. Since the identical configuration of the Case-1 is assumed, only the exploded side view of the welded composite parts, namely the omega-shaped airframe stiffener 100 and the fuselage skin 101, need be referenced. Identical to the assembling method presented in Case 1, the heating element 102 may soften the weld interface through resistive heating. The weld surface temperature may be monitored employing thin thermocouples to minimize perturbing the temperature homogeneity at the weld surface. Once a desired temperature is reached at the weld surface, a tensile force ("N (kN)") not shown in FIG. 1 may be applied on the whole section of the stiffener 100. The tensile force ("N (kN)") is the reverse of the "P (bar)" force shown in FIG. 1. The position of the fuselage skin 101 may be fixed (e.g., with a clamp or tool) to facilitate the disassembling process. Successful disassembling may be relied on accurate temperature measurement on the weld interface as it can be the main guiding parameter for separating the surfaces with minimum tensile force.

Figure 2B:
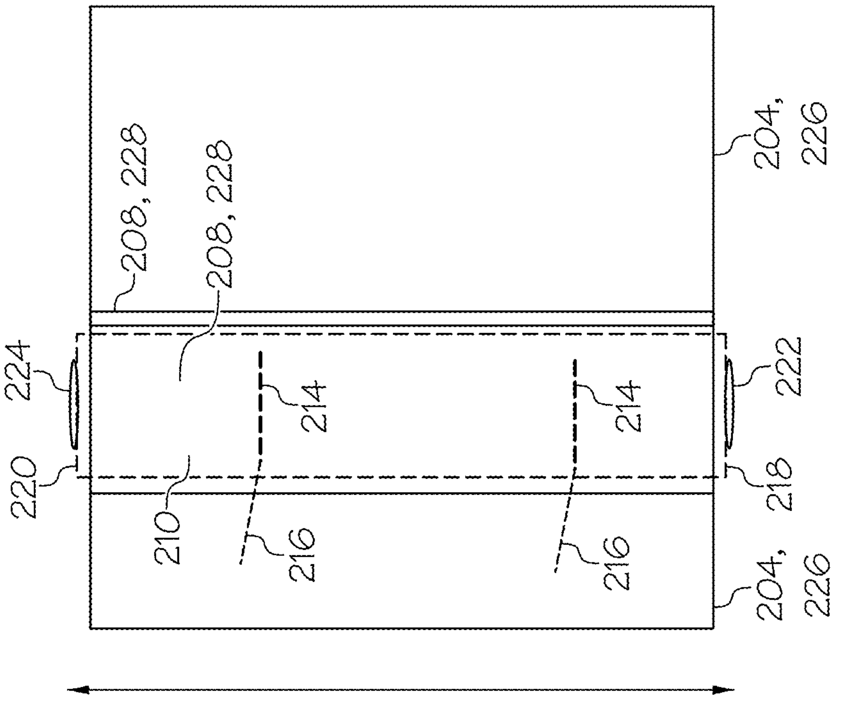
FIG. 2B is a top view of the polymer matrix composite joint of FIGS. 2A.
Figure 2A:
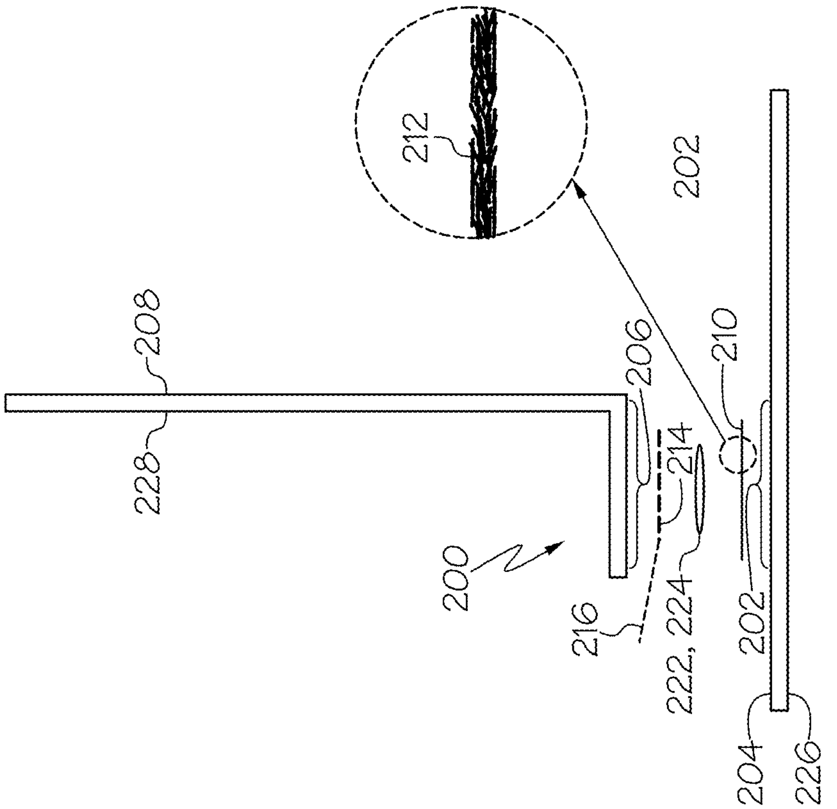
FIG. 2A is an exploded side view of another example of a polymer matrix composite joint.
Figure 3:
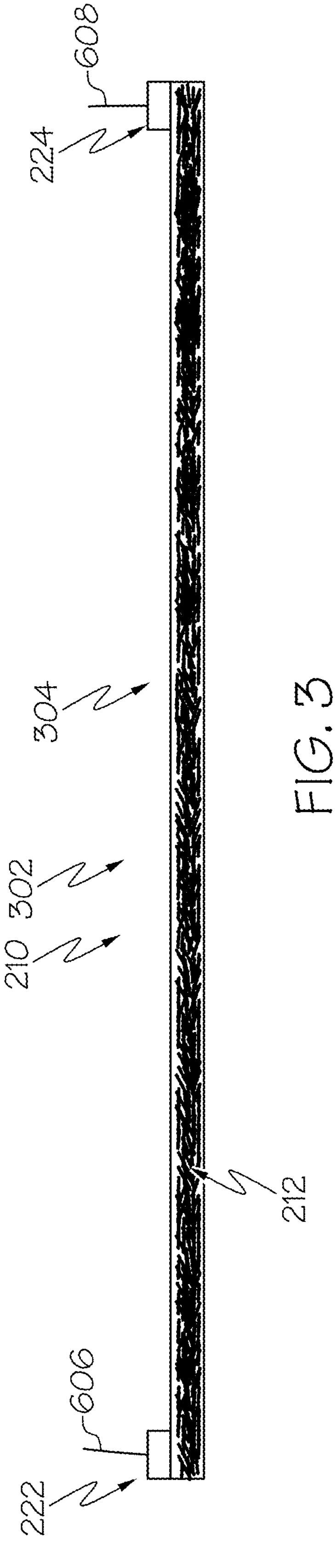
FIG. 3 is a side view of an example of a resistive film heating element.
Figure 4B:
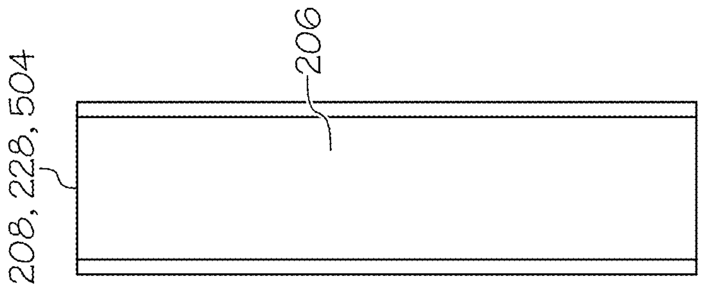
FIG. 4B is a bottom view of an example of a second polymer matrix composite structure showing a second contact area.
Figure 4A:
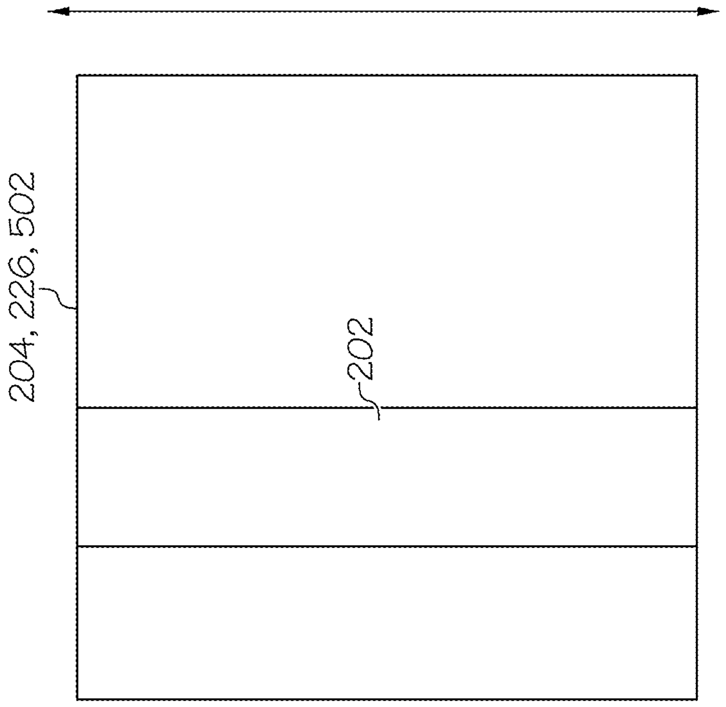
FIG. 4A is a top view of an example of a first polymer matrix composite structure showing a first contact area.
Figure 5B:
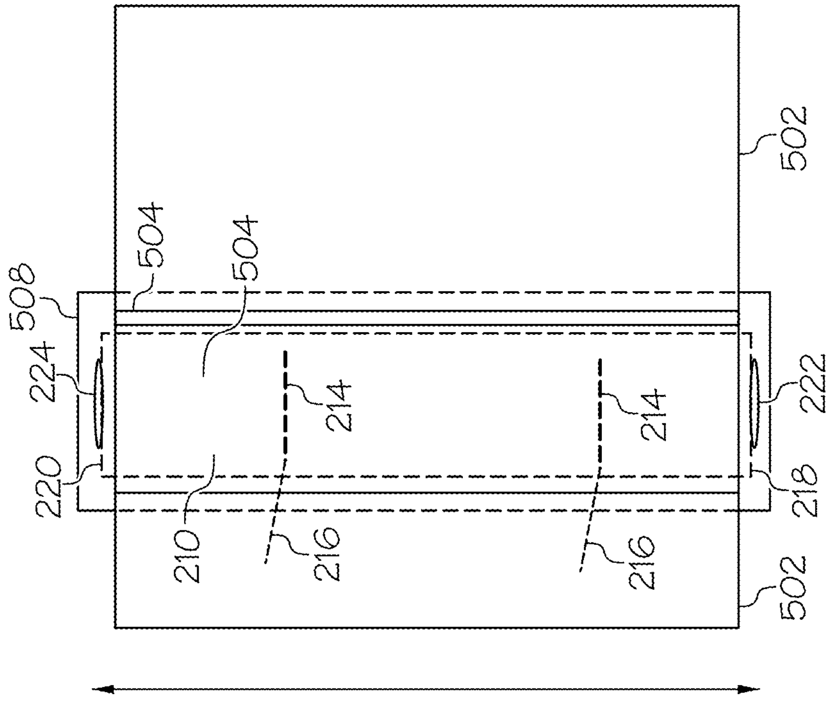
FIG. 5B is a top view of the polymer matrix composite joint of FIG. 5A.
Figure 5A:
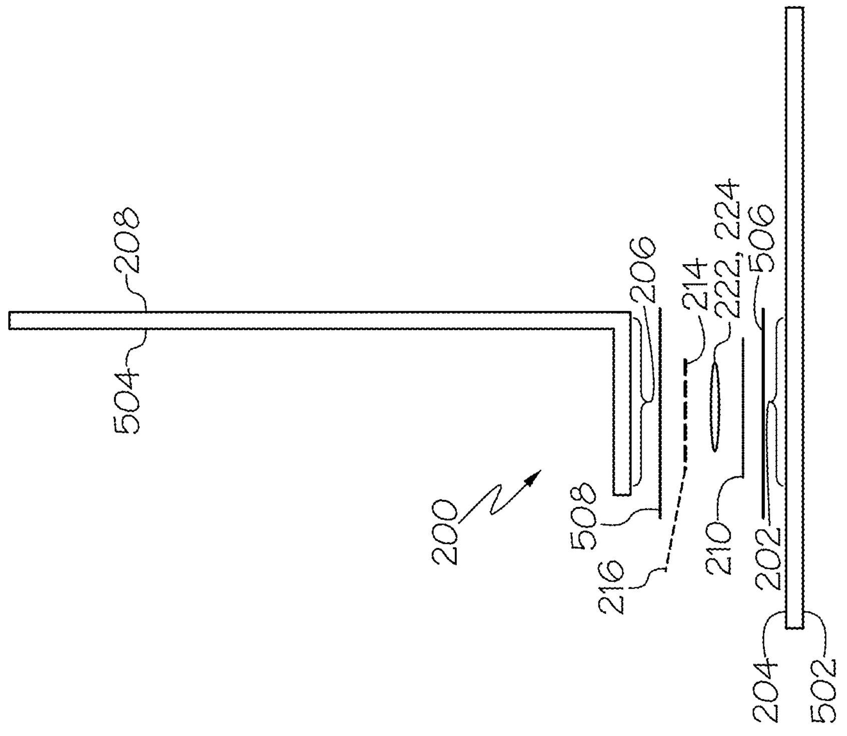
FIG. 5A is an exploded side view of yet another example of a polymer matrix composite joint.
Figure 6:
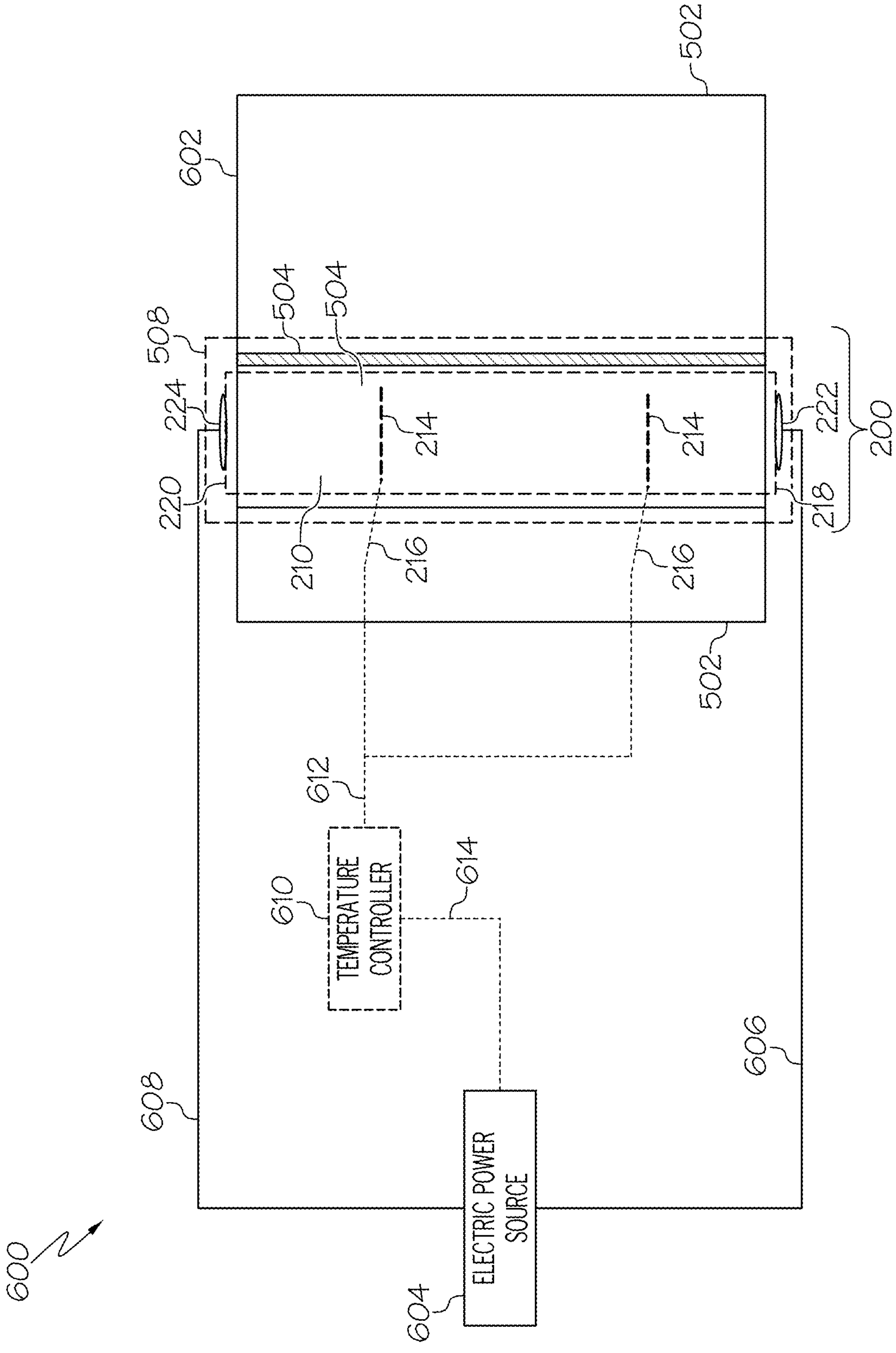
FIG. 6 is a functional block diagram of an example of a system for processing a polymer matrix composite joint.

Referring generally to FIGS. 2A-B, 3, 4A-B, 5A-B and 6, by way of examples, the present disclosure is directed to a polymer matrix composite joint 200. FIG. 2A is an exploded side view of an example of the polymer matrix composite joint 200. FIG. 2B is a top view of the polymer matrix composite joint 200 of FIGS. 2A. FIG. 3 is a side view of an example of a resistive film heating element 210. FIG. 4A is a top view of an example of a first polymer matrix composite structure 204 showing a first contact area 202. FIG. 4B is a bottom view of an example of a second polymer matrix composite structure 208 showing a second contact area 206. FIG. 5A is an exploded side view of yet another example of the polymer matrix composite joint 200. FIG. 5B is a top view of the polymer matrix composite joint 200 of FIG. 5A. FIG. 6 is a functional block diagram of an example of a system 600 for processing the polymer matrix composite joint 200.

With reference again to FIGS. 2A-B, 3, 4A-B, 5A-B and 6, in one or more example, a polymer matrix composite joint 200 includes a first contact area 202 of a first polymer matrix composite structure 204, a second contact area 206 of a second polymer matrix composite structure 208 and a resistive film heating element 210. The second contact area 206 is sized and shaped based on the first contact area 202. The resistive film heating element 210 includes a lignin-based carbonaceous material 212. The resistive film heating element 210 defines a longitudinal form and is disposed between the first contact area 202 and the second contact area 206. The resistive film heating element 210 is sized and shaped based on the first contact area 202 and the second contact area 206. The resistive film heating element 210 is for joining the first polymer matrix composite structure 204 and the second polymer matrix composite structure 208 at the first contact area 202 and the second contact area 206 using a resistive welding process.

In another example of the polymer matrix composite joint 200, the first polymer matrix composite structure 204 and the second polymer matrix composite structure 208 include a thermoplastic material. In yet another example of the polymer matrix composite joint 200, the lignin-based carbonaceous material 212 includes a lignin-based graphene material, a lignin-based graphite material, lignin-based graphene flakes, lignin-based graphite flakes or any other suitable lignin-based carbonaceous material in any suitable combination. In still another example of the polymer matrix composite joint 200, the resistive film heating element 210 also includes a thickness of approximately 1 nm to approximately 10 nm, approximately 10 nm to approximately 100 nm, approximately 100 nm to approximately 1 μm, approximately 1 μm to approximately 10 μm, approximately 10 μm to approximately 100 μm, approximately 100 μm to approximately 1 mm or any other suitable thickness. In still yet another example of the polymer matrix composite joint 200, a length of the resistive film heating element 210 includes a maximum length based on electrical conductivity properties of the resistive film heating element 210 and a desired electric current through the resistive film heating element 210. In a further example, where lengths of the first polymer matrix composite structure 204 and the second polymer matrix composite structure 208 exceed the maximum length of the resistive film heating element 210, additional resistive film heating elements 210 are used to form additional polymer matrix composite joints 200 to fully join the first polymer matrix composite structure 204 and the second polymer matrix composite structure 208.

In another example of the polymer matrix composite joint 200, the resistive film heating element 210 also includes a composite material 302 with a polymer matrix 304. The lignin-based carbonaceous material 212 is blended with the polymer matrix 304. In a further example, the polymer matrix 304 includes a polypropylene material, a polybutadiene material, a polyvinyl alcohol material, a high-density polyethylene material, a low-density polyethylene material, a linear low-density polyethylene material or any other suitable polymer material in any suitable combination. In another further example, the composite material 302 of the resistive film heating element 210 includes a thickness of approximately 1 nm to approximately 10 nm, approximately 10 nm to approximately 100 nm, approximately 100 nm to approximately 1 μm, approximately 1 μm to approximately 10 μm, approximately 10 μm to approximately 100 μm, approximately 100 μm to approximately 1 mm or any other suitable thickness. In yet another example of the polymer matrix composite joint 200, the first contact area 202, the resistive film heating element 210 and the second contact area 206 are in intimate and continuous contact. In still another example of the polymer matrix composite joint 200, the first contact area 202, the resistive film heating element 210 and the second contact area 206 are joined by autohesion in conjunction with the resistive welding process.

In still yet another example of the polymer matrix composite joint 200, the first contact area 202, the resistive film heating element 210 and the second contact area 206 are joined by creating entanglements between polymer chains of the first contact area 202 and the second contact area 206 in conjunction with the resistive welding process. In another example of the polymer matrix composite joint 200, the first contact area 202, the resistive film heating element 210 and the second contact area 206 are joined by molecular diffusion of polymer chains of the first contact area 202 and the second contact area 206 in conjunction with the resistive welding process. In yet another example, the polymer matrix composite joint 200 also includes at least one temperature sensor 214 embedded in the polymer matrix composite joint 200 proximate the resistive film heating element 210 with one or more lead 216 for each temperature sensor 214 exposed externally for connection with a temperature controller 610. In a further example, the at least one temperature sensor 214 includes one or more thermocouple, one or more resistance temperature detector, one or more thermistor or any other suitable temperature sensor in any suitable combination.

In another example of the polymer matrix composite joint 200, the first polymer matrix composite structure 204 includes a first thermoset composite structure 502 with the first contact area 202 and the second polymer matrix composite structure 208 includes a second thermoset composite structure 504 with the second contact area 206. In this example, the polymer matrix composite joint 200 also includes a first thermoplastic film 506 and a second thermoplastic film 508. The first thermoplastic film 506 is disposed between the first contact area 202 of the first thermoset composite structure 502 and the resistive film heating element 210. The first thermoplastic film 506 is sized and shaped based on the first contact area 202 and the resistive film heating element 210. The second thermoplastic film 508 is disposed between the resistive film heating element 210 and the second contact area 206 of the second thermoset composite structure 504. The second thermoplastic film 508 is sized and shaped based on the resistive film heating element 210 and the second contact area 206.

In a further example, the first thermoplastic film 506 and the second thermoplastic film 508 includes a thickness of approximately 20 μm to approximately 100 μm. In another further example, the first thermoplastic film 506 and the second thermoplastic film 508 include a linear low-density polyethylene material, a polypropylene material, a polyvinyl alcohol material or any other suitable polymer material in any suitable combination. In yet another further example, the resistive film heating element 210, the first thermoplastic film 506 and the second thermoplastic film 508 are for joining the first thermoset composite structure 502 and the second thermoset composite structure 504 at the first contact area 202 and the second contact area 206 using the resistive welding process. In still another further example, the first contact area 202, the first thermoplastic film 506, the resistive film heating element 210, the second thermoplastic film 508 and the second contact area 206 are in intimate and continuous contact.

In still yet another further example, the first contact area 202, the first thermoplastic film 506, the resistive film heating element 210, the second thermoplastic film 508 and the second contact area 206 are joined by autohesion in conjunction with the resistive welding process. In another further example, the first contact area 202, the first thermoplastic film 506, the resistive film heating element 210, the second thermoplastic film 508 and the second contact area 206 are joined by creating entanglements between polymer chains of the first contact area 202 and the first thermoplastic film 506 and by creating entanglements between polymer chains of the second thermoplastic film 508 and the second contact area 206 in conjunction with the resistive welding process. In yet another further example, the first contact area 202, the first thermoplastic film 506, the resistive film heating element 210, the second thermoplastic film 508 and the second contact area 206 are joined by molecular diffusion of polymer chains of the first contact area 202, the first thermoplastic film 506, the second thermoplastic film 508 and the second contact area 206 in conjunction with the resistive welding process.

In yet another example of the polymer matrix composite joint 200, the longitudinal form of the resistive film heating element 210 defines a proximal end 218 and a distal end 220. In this example, the polymer matrix composite joint 200 also includes a first electrical connection 222 and a second electrical connection 224. The first electrical connection 222 is at the proximal end 218 of the resistive film heating element 210 for receiving a power line 606 from an electric power source 604. The second electrical connection 224 is at the distal end 220 of the resistive film heating element 210 for receiving a return line 608 from the electric power source 604. In a further example, the first electrical connection 222 and the second electrical connection 224 include a copper material, a copper alloy material, a copper mesh material, an aluminum material, an aluminum alloy material or any other suitable conductive material in any suitable. In another further example, the electric power source 604 includes a direct current power source.

Figure 7:
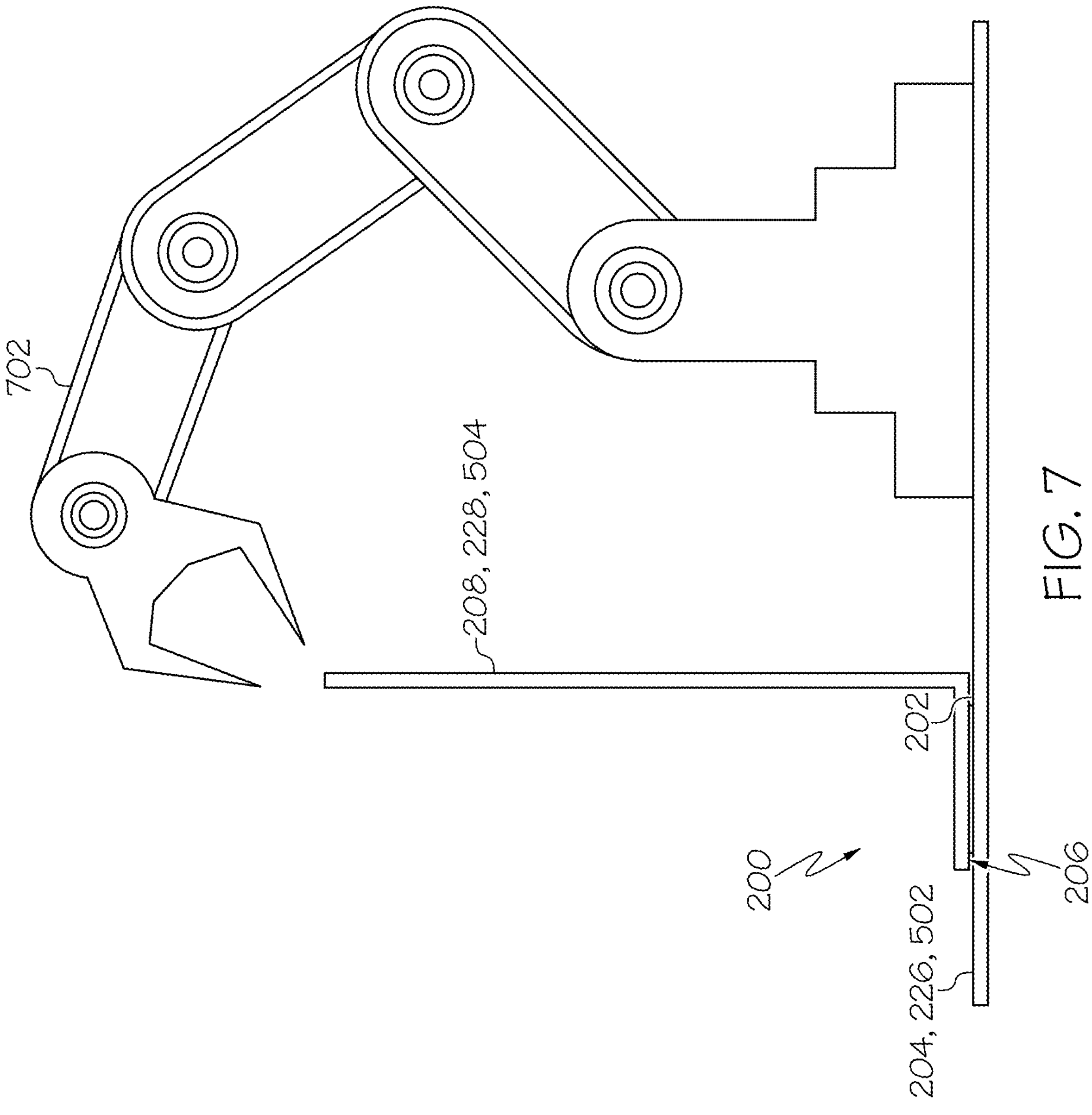
FIG. 7 is a functional diagram of an example of the system of FIG. 6 in which a tool is used in conjunction with de-welding the polymer matrix composite joint.

Referring generally to FIGS. 2A-B, 5A-B, 6 and 7, by way of examples, the present disclosure is directed to a system 600 for processing a polymer matrix composite joint 200. FIG. 2A is an exploded side view of an example of the polymer matrix composite joint 200. FIG. 2B is a top view of the polymer matrix composite joint 200 of FIGS. 2A. FIG. 5A is an exploded side view of yet another example of the polymer matrix composite joint 200. FIG. 5B is a top view of the polymer matrix composite joint 200 of FIG. 5A. FIG. 6 is a functional block diagram of an example of the system 600 for processing the polymer matrix composite joint 200. FIG. 7 is a functional diagram of an example of the system 600 of FIG. 6 in which a tool 702 is used in conjunction with de-welding the polymer matrix composite joint 200.

With reference again to FIGS. 2A-B, 5A-B, 6 and 7, in one or more example, a system 600 for processing a polymer matrix composite joint 200 includes a polymer matrix composite workpiece 602 and an electric power source 604. The polymer matrix composite workpiece 602 includes the polymer matrix composite joint 200. The electric power source 604 includes a power line 606 connected to the first electrical connection 222 and a return line 608 connected to the second electrical connection 224.

In another example of the system 600, the polymer matrix composite joint 200 also includes at least one temperature sensor 214 embedded in the polymer matrix composite joint 200 proximate the resistive film heating element 210 with one or more lead 216 for each temperature sensor 214 exposed externally. In this example, the system 600 also includes a temperature controller 610 with one or more control wire 612 connected to the one or more lead 216 of the at least one temperature sensor 214 to determine a current temperature of the resistive film heating element 210 and at least one additional wire 614 connected to the electric power source 604 to control electric current flowing through the resistive film heating element 210 in response to the current temperature. In a further example, the first contact area 202 of the first polymer matrix composite structure 204 is de-welded from the second contact area 206 of the second polymer matrix composite structure 208 after a third predetermined temperature of the resistive film heating element 210 is achieved. In another further example, the system 600 also includes at least one tool 702 to selectively separate the first contact area 202 of the first polymer matrix composite structure 204 from the second contact area 206 of the second polymer matrix composite structure 208 after the first contact area 202 and the second contact area 206 are de-welded. In an even further example, the at least one tool 702 includes one or more robotic end effector, one or more hoist, one or more crane or any other suitable tool in any suitable combination.

In yet another example of the system 600, the first polymer matrix composite structure 204 includes a first thermoset composite structure 502 with the first contact area 202 and the second polymer matrix composite structure 208 includes a second thermoset composite structure 504 with the second contact area 206. In this example, the polymer matrix composite joint 200 also includes a first thermoplastic film 506 and a second thermoplastic film 508. The first thermoplastic film 506 is disposed between the first contact area 202 of the first thermoset composite structure 502 and the resistive film heating element 210. The first thermoplastic film 506 is sized and shaped based on the first contact area 202 and the resistive film heating element 210. The second thermoplastic film 508 is disposed between the resistive film heating element 210 and the second contact area 206 of the second thermoset composite structure 504. The second thermoplastic film 508 is sized and shaped based on the resistive film heating element 210 and the second contact area 206.

In a further example, the polymer matrix composite joint 200 also includes at least one temperature sensor 214 embedded in the polymer matrix composite joint 200 proximate the resistive film heating element 210 with one or more lead 216 for each temperature sensor 214 exposed externally. In this example, the system 600 also includes a temperature controller 610 with one or more control wire 612 connected to the one or more lead 216 of the at least one temperature sensor 214 to determine a current temperature of the resistive film heating element 210 and at least one additional wire 614 connected to the electric power source 604 to control electric current flowing through the resistive film heating element 210 in response to the current temperature. In an even further example, the first contact area 202 of the first thermoset composite structure 502 is de-welded from the second contact area 206 of the second thermoset composite structure 504 after a third predetermined temperature of the resistive film heating element 210 is achieved. In another even further example, the system 600 also includes at least one tool 702 to selectively separate the first contact area 202 of the first thermoset composite structure 502 from the second contact area 206 of the second thermoset composite structure 504 after the first contact area 202 and the second contact area 206 are de-welded.

Figure 8:
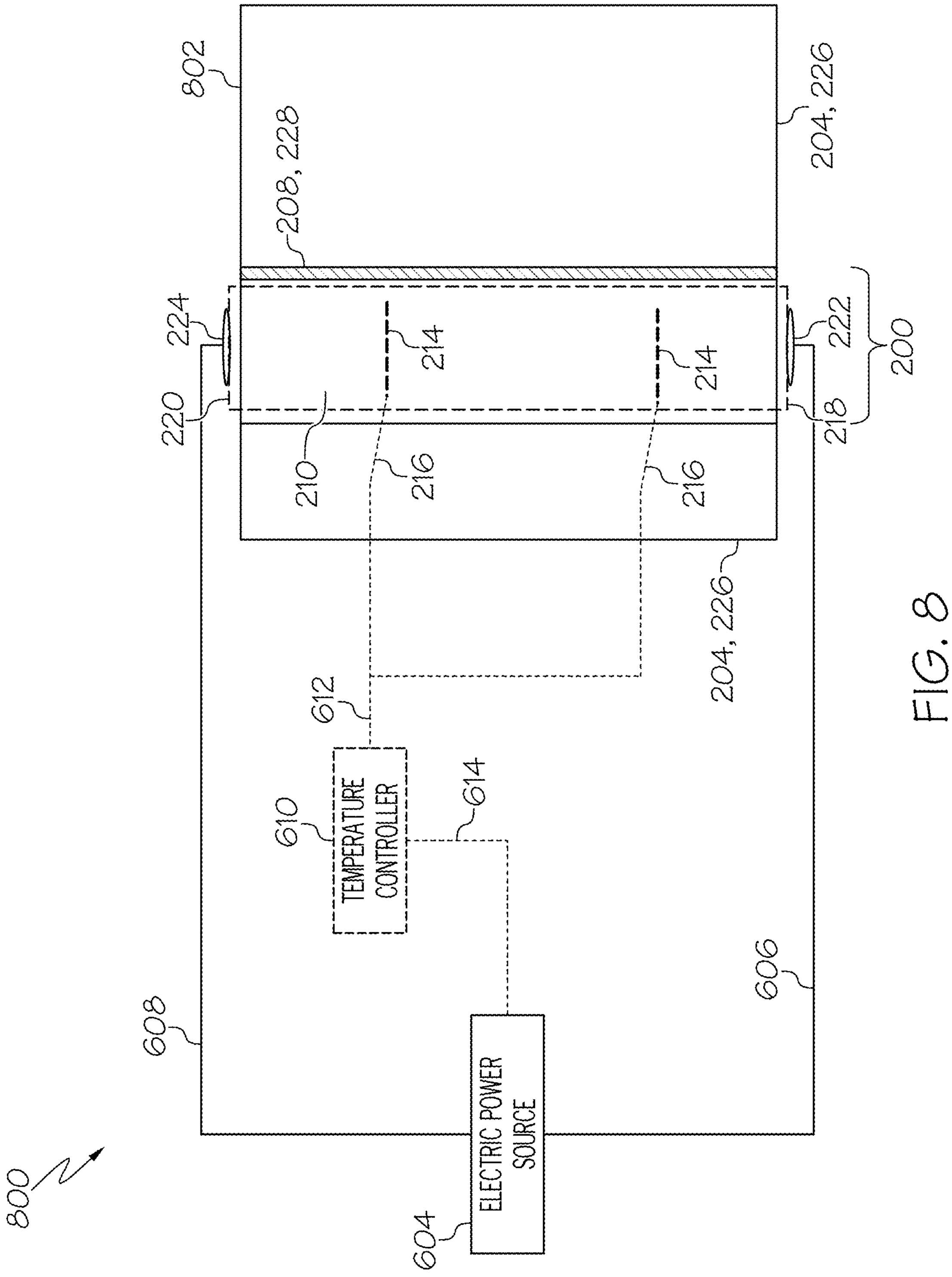
FIG. 8 is a functional diagram of another example of a system for processing a polymer matrix composite joint.
Figure 9:
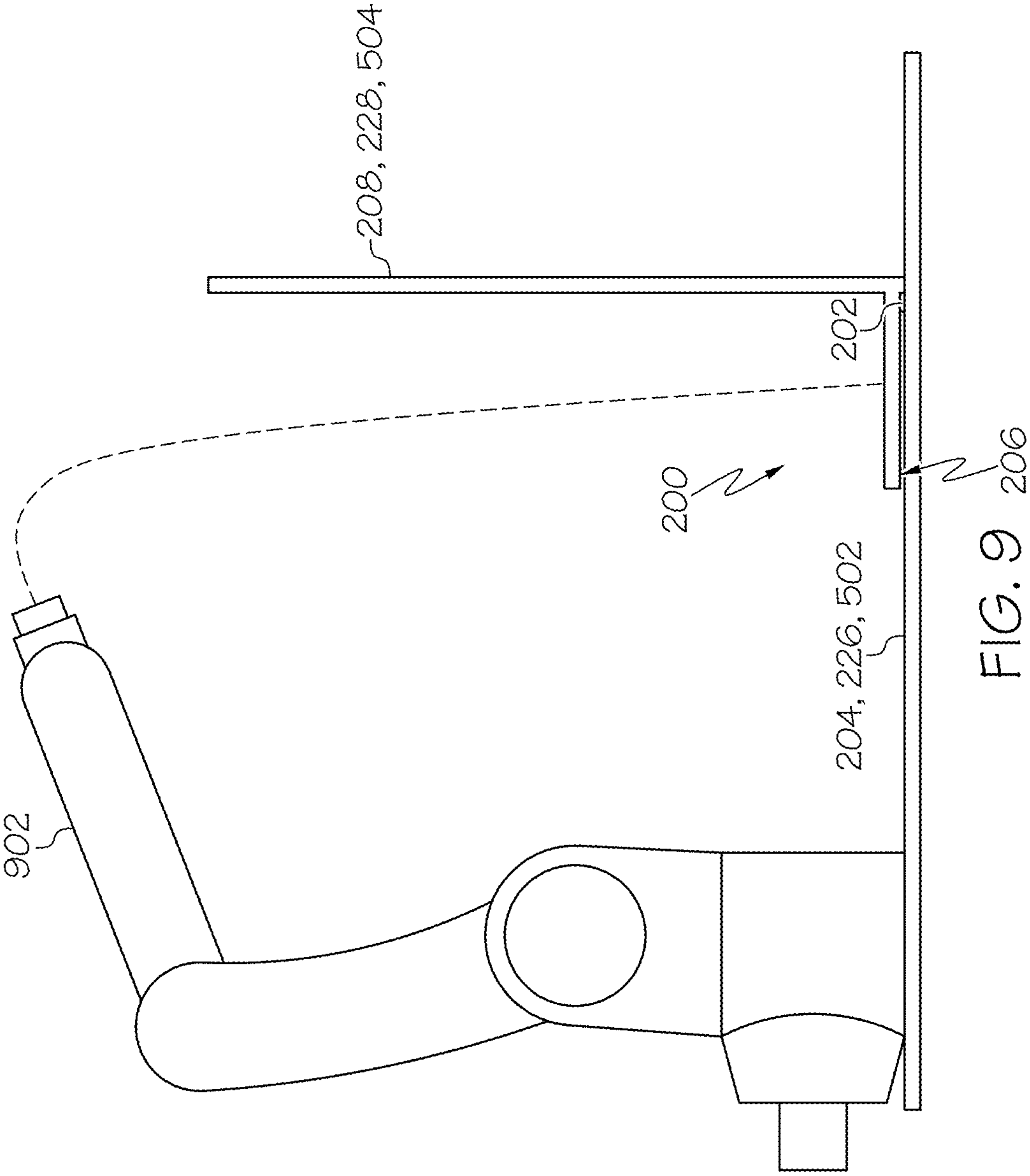
FIG. 9 is a functional diagram of an example of the system of FIG. 7 in which a tool is used in conjunction with welding the polymer matrix composite joint.

Referring generally to FIGS. 2A-B, 5A-B and 6-9, by way of examples, the present disclosure is directed to a system 800 for processing a polymer matrix composite joint 200. FIG. 2A is an exploded side view of an example of the polymer matrix composite joint 200. FIG. 2B is a top view of the polymer matrix composite joint 200 of FIGS. 2A. FIG. 5A is an exploded side view of yet another example of the polymer matrix composite joint 200. FIG. 5B is a top view of the polymer matrix composite joint 200 of FIG. 5A. FIG. 6 is a functional block diagram of an example of a system 600 for processing the polymer matrix composite joint 200. FIG. 7 is a functional diagram of an example of the system 600 of FIG. 6 in which a tool 702 is used in conjunction with de-welding the polymer matrix composite joint 200. FIG. 8 is a functional diagram of an example of the system 800 for processing a polymer matrix composite joint 200. FIG. 9 is a functional diagram of an example of the system 800 of FIG. 7 in which a tool 902 is used in conjunction with welding the polymer matrix composite joint 200.

With reference again to FIGS. 2A-B, 5A-B and 6-9, in one or more example, a system 800 for processing a polymer matrix composite joint 200 includes a polymer matrix composite workpiece 802. The polymer matrix composite workpiece 802 includes the polymer matrix composite joint 200. In another example, the system 800 also includes at least one tool 902 to selectively apply a compression force to the polymer matrix composite joint 200 to hold a stack of the first contact area 202 of the first polymer matrix composite structure 204, the resistive film heating element 210 and the second contact area 206 of the second polymer matrix composite structure 208 in place for the resistive welding process. In a further example, the at least one tool 902 includes one or more clamp, one or more locking pliers, one or more robotic end effector or another other suitable tool in any suitable combination.

In yet another example of the system 800, the longitudinal form of the resistive film heating element 210 defines a proximal end 218 and a distal end 220. In this example, the polymer matrix composite joint 200 also includes a first electrical connection 222 and a second electrical connection 224. The first electrical connection 222 is at the proximal end 218 of the resistive film heating element 210. The second electrical connection 224 is at the distal end 220 of the resistive film heating element 210. In this example, the system 800 also includes an electric power source 604 with a power line 606 connected to the first electrical connection 222 and a return line 608 connected to the second electrical connection 224. In a further example, the polymer matrix composite joint 200 also includes at least one temperature sensor 214 embedded in the polymer matrix composite joint 200 proximate the resistive film heating element 210 with one or more lead 216 for each temperature sensor 214 exposed externally. In this example, the system 800 also includes a temperature controller 610 with one or more control wire 612 connected to the one or more lead 216 of the at least one temperature sensor 214 to determine a current temperature of the resistive film heating element 210 and at least one additional wire 614 connected to the electric power source 604 to control electric current flowing through the resistive film heating element 210 in response to the current temperature.

In an even further example, the system 800 also includes at least one tool 902 to selectively apply a consolidation force to the polymer matrix composite joint 200 to consolidate a stack of the first contact area 202 of the first polymer matrix composite structure 204, the resistive film heating element 210 and the second contact area 206 of the second polymer matrix composite structure 208 after a first predetermined temperature of the resistive film heating element 210 is achieved. In an even yet further example, the at least one tool 902 includes one or more clamp, one or more locking pliers, one or more robotic end effector or any other suitable tool in any suitable combination. In another even further example, the first contact area 202 of the first polymer matrix composite structure 204 is welded to the second contact area 206 of the second polymer matrix composite structure 208, with the resistive film heating element 210 therebetween, after a second predetermined temperature of the resistive film heating element 210 is achieved.

In still another example of the system 800, the first polymer matrix composite structure 204 includes a first thermoset composite structure 502 with the first contact area 202 and the second polymer matrix composite structure 208 includes a second thermoset composite structure 504 with the second contact area 206. In this example, the polymer matrix composite joint 200 also includes a first thermoplastic film 506 and a second thermoplastic film 508. The first thermoplastic film 506 is disposed between the first contact area 202 of the first thermoset composite structure 502 and the resistive film heating element 210. The first thermoplastic film 506 is sized and shaped based on the first contact area 202 and the resistive film heating element 210. The second thermoplastic film 508 is disposed between the resistive film heating element 210 and the second contact area 206 of the second thermoset composite structure 504. The second thermoplastic film 508 is sized and shaped based on the resistive film heating element 210 and the second contact area 206. In a further example, the system 800 also includes at least one tool 902 to selectively apply a compression force to the polymer matrix composite joint 200 to hold a stack of the first contact area 202 of the first thermoset composite structure 502, the first thermoplastic film 506, the resistive film heating element 210, the second thermoplastic film 508, and the second contact area 206 of the second thermoset composite structure 504 in place for the resistive welding process.

In another further example, the longitudinal form of the resistive film heating element 210 defines a proximal end 218 and a distal end 220. In this example, the polymer matrix composite joint 200 also includes a first electrical connection 222 and a second electrical connection 224. The first electrical connection 222 is at the proximal end 218 of the resistive film heating element 210. The second electrical connection 224 is at the distal end 220 of the resistive film heating element 210. In this example, the system 800 also includes an electric power source 604 with a power line 606 connected to the first electrical connection 222 and a return line 608 connected to the second electrical connection 224. In an even further example, the polymer matrix composite joint 200 also includes at least one temperature sensor 214 embedded in the polymer matrix composite joint 200 proximate the resistive film heating element 210 with one or more lead 216 for each temperature sensor 214 exposed externally. In this example, the system 800 also includes a temperature controller 610 with one or more control wire 612 connected to the one or more lead 216 of the at least one temperature sensor 214 to determine a current temperature of the resistive film heating element 210 and at least one additional wire 614 connected to the electric power source 604 to control electric current flowing through the resistive film heating element 210 in response to the current temperature.

In an even yet further example, the system 800 also includes at least one tool 902 to selectively apply a consolidation force to the polymer matrix composite joint 200 to consolidate a stack of the first contact area 202 of the first thermoset composite structure 502, the first thermoplastic film 506, the resistive film heating element 210, the second thermoplastic film 508 and the second contact area 206 of the second thermoset composite structure 504 after a first predetermined temperature of the resistive film heating element 210 is achieved. In another even yet further example, the first contact area 202 of the first thermoset composite structure 502 is welded to the second contact area 206 of the second thermoset composite structure 504 with the first thermoplastic film 506, with the resistive film heating element 210 and the second thermoplastic film 508 therebetween, after a second predetermined temperature of the resistive film heating element 210 is achieved.

Figure 10:
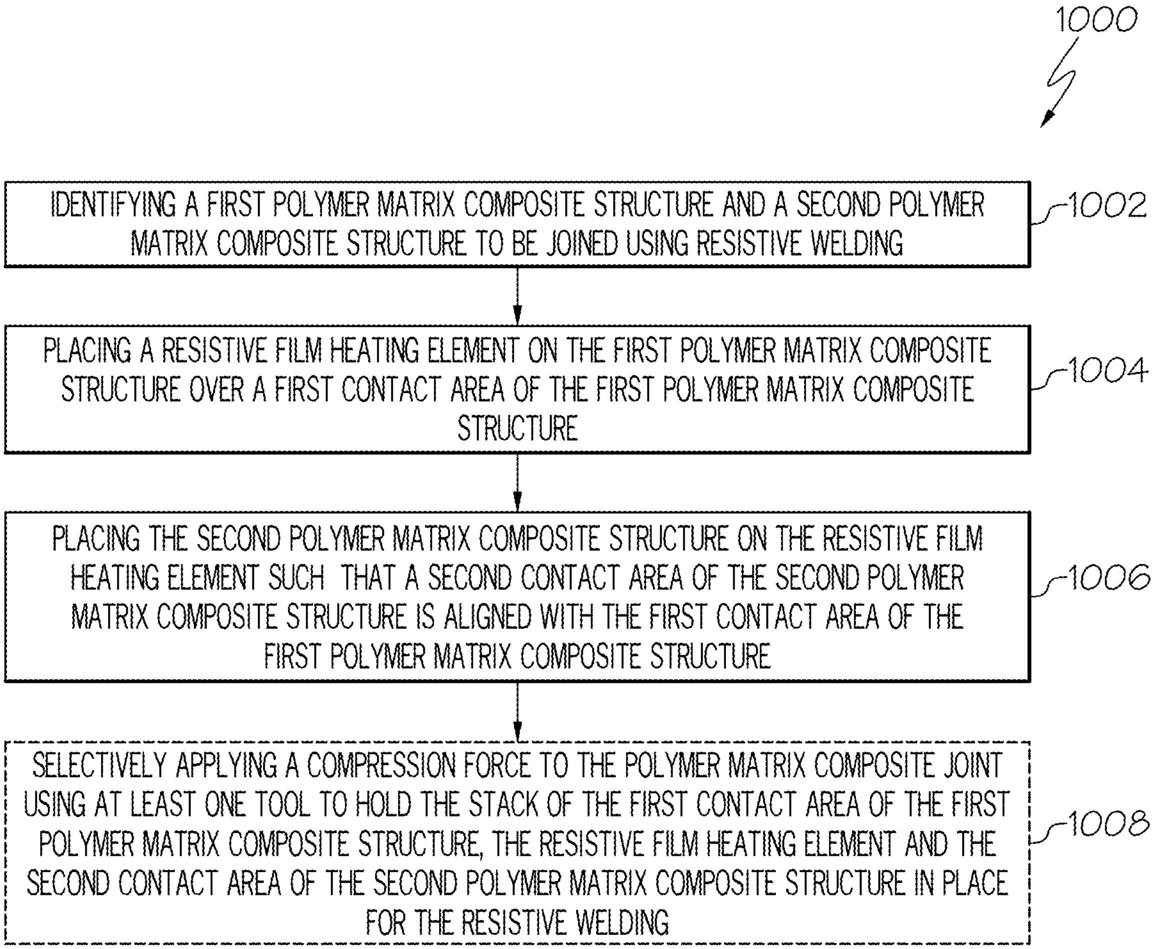
FIG. 10 is a flow diagram of an example of a method for processing a polymer matrix composite joint.
Figure 11:
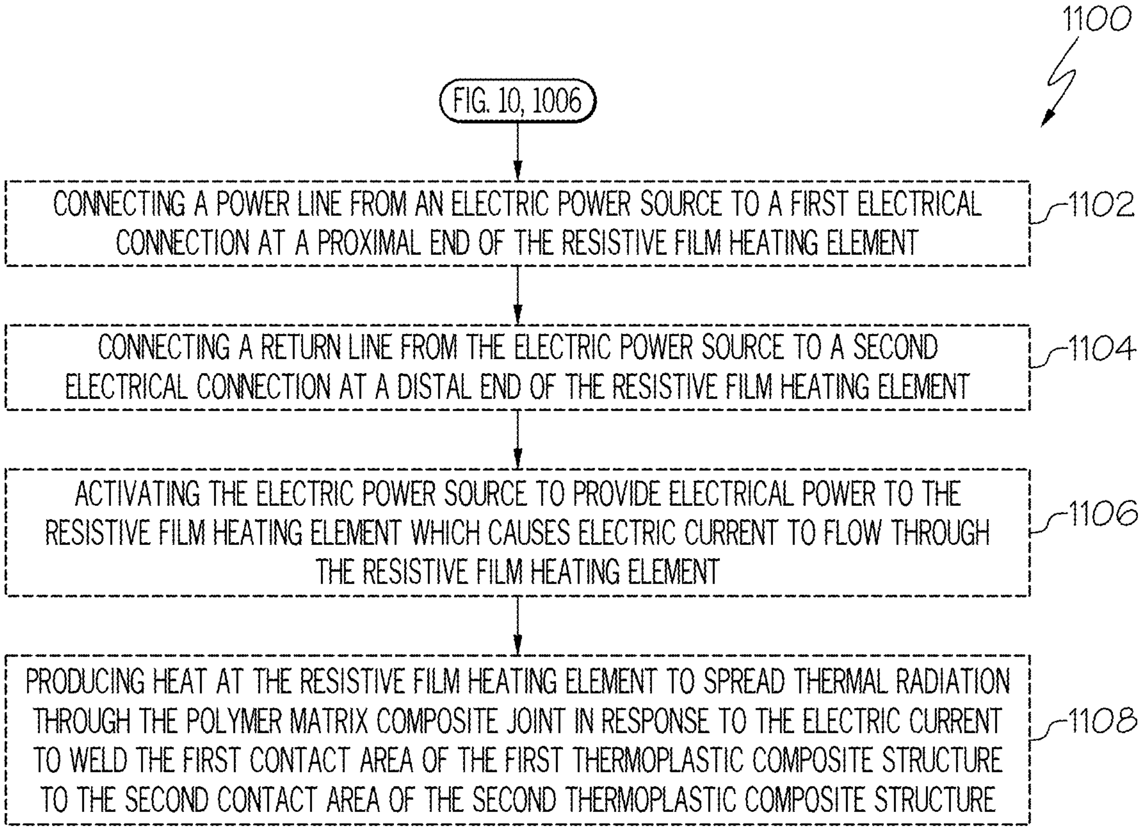
FIG. 11, in combination with FIG. 10, is a flow diagram of another example of a method for processing a polymer matrix composite joint.

Referring generally to FIGS. 2A-B, 3, 5A-B, 6, 9 and 10-19, by way of examples, the present disclosure is directed to a method 1000, 1100, 1200, 1300, 1400, 1500, 1600, 1700, 1800, 1900 for processing a polymer matrix composite joint 200. FIG. 2A is an exploded side view of an example of the polymer matrix composite joint 200. FIG. 2B is a top view of the polymer matrix composite joint 200 of FIGS. 2A. FIG. 3 is a side view of an example of a resistive film heating element 210. FIG. 5A is an exploded side view of yet another example of the polymer matrix composite joint 200. FIG. 5B is a top view of the polymer matrix composite joint 200 of FIG. 5A. FIG. 6 is a functional block diagram of an example of a system 600 for processing the polymer matrix composite joint 200. FIG. 9 is a functional diagram of an example of the system 800 of FIG. 7 in which a tool 902 is used in conjunction with welding the polymer matrix composite joint 200. FIG. 10 provides an example of the method 1000 for processing a polymer matrix composite joint 200. FIG. 11, in combination with FIG. 10, provides an example of the method 1100 for processing a polymer matrix composite joint 200.

Figure 12:
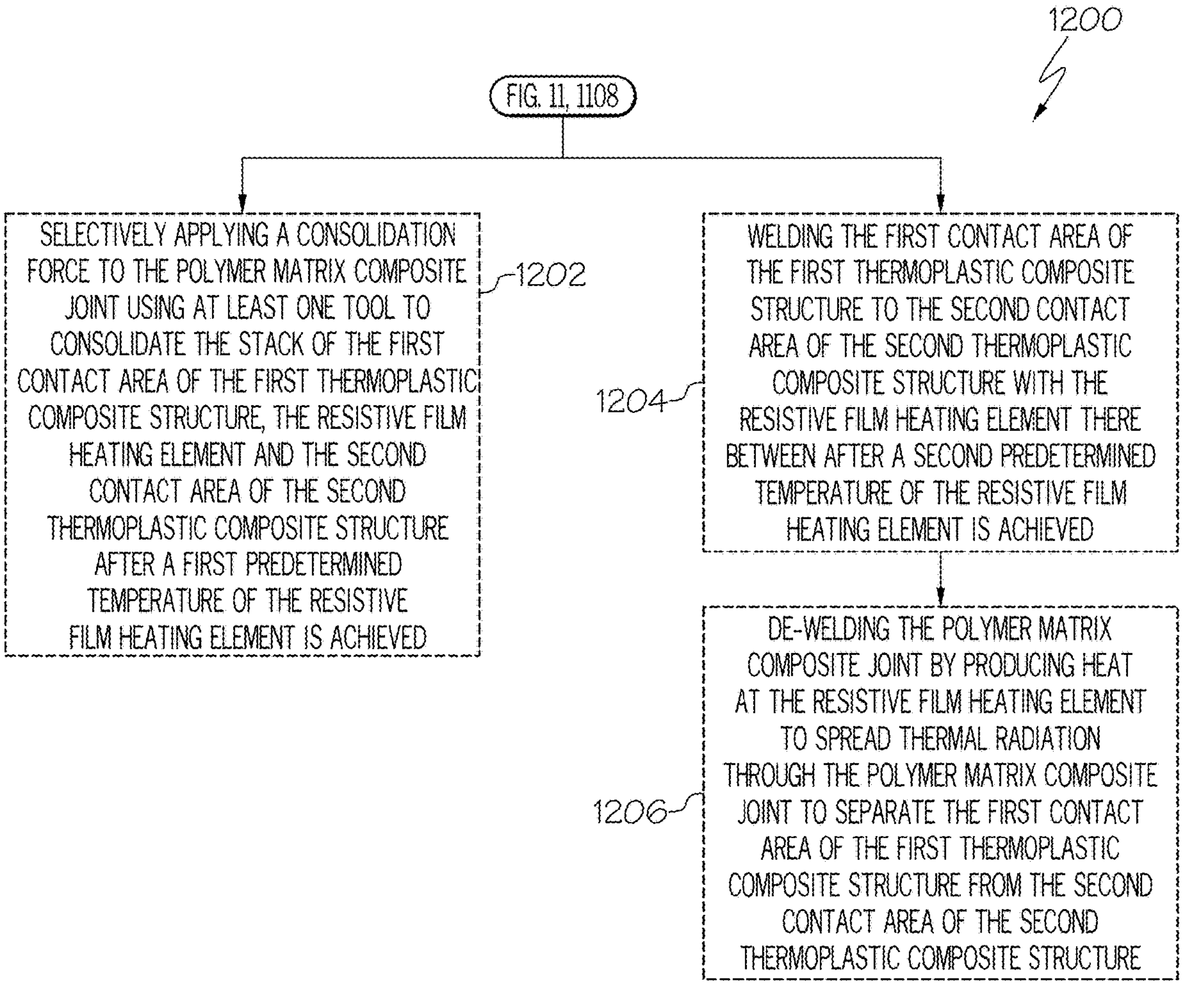
FIG. 12, in combination with FIGS. 10 and 11, is a flow diagram of yet another example of a method for processing a polymer matrix composite joint.
Figure 13:
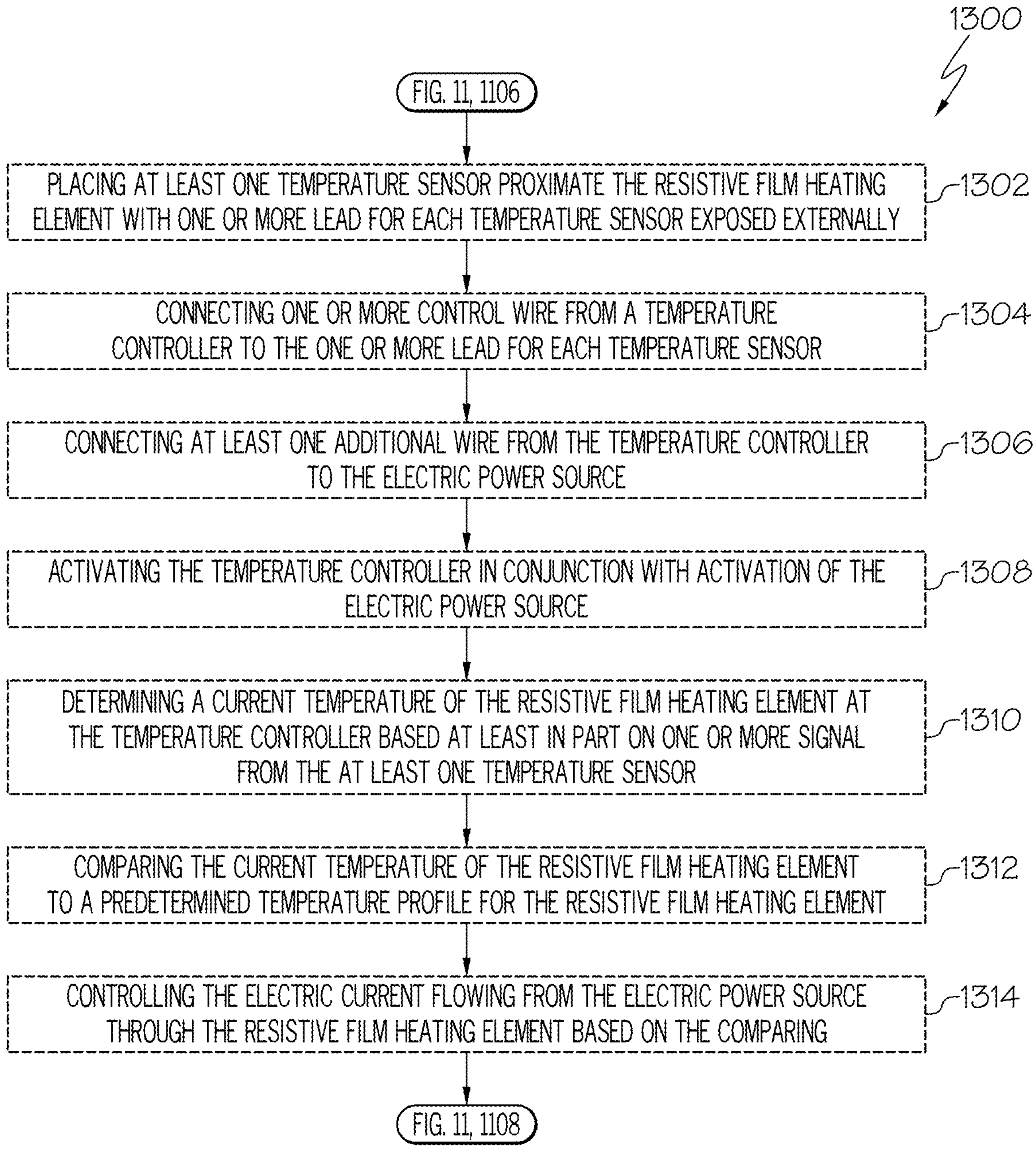
FIG. 13, in combination with FIGS. 10 and 11, is a flow diagram of still another example of a method for processing a polymer matrix composite joint.
Figure 14:
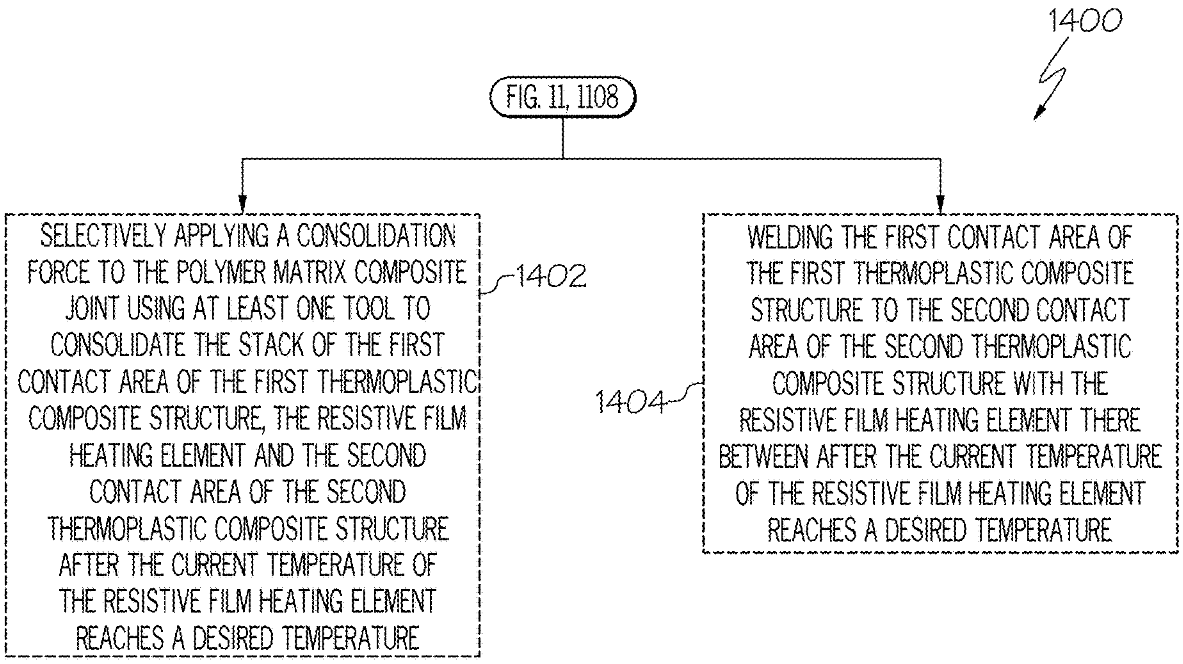
FIG. 14, in combination with FIGS. 10 and 11, is a flow diagram of still yet another example of a method for processing a polymer matrix composite joint.
Figure 15:
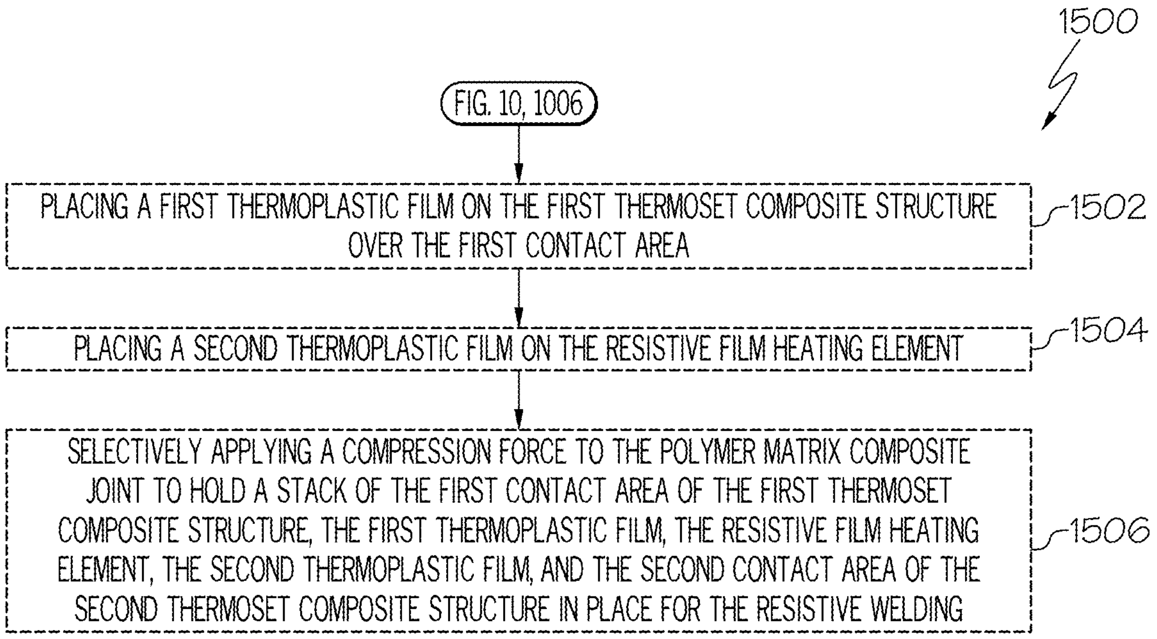
FIG. 15, in combination with FIG. 10, is a flow diagram of another example of a method for processing a polymer matrix composite joint.
Figure 16:
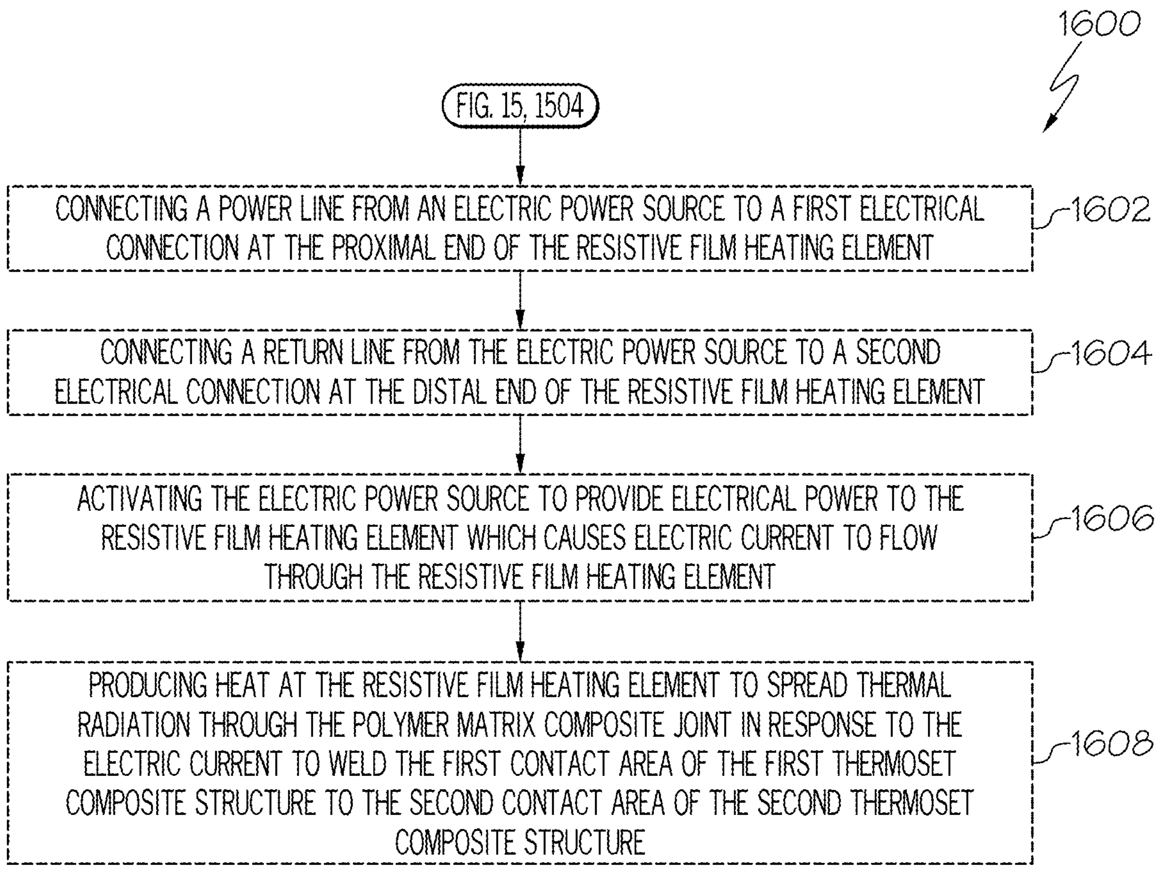
FIG. 16, in combination with FIGS. 10 and 15, is a flow diagram of yet another example of a method for processing a polymer matrix composite joint.
Figure 17:
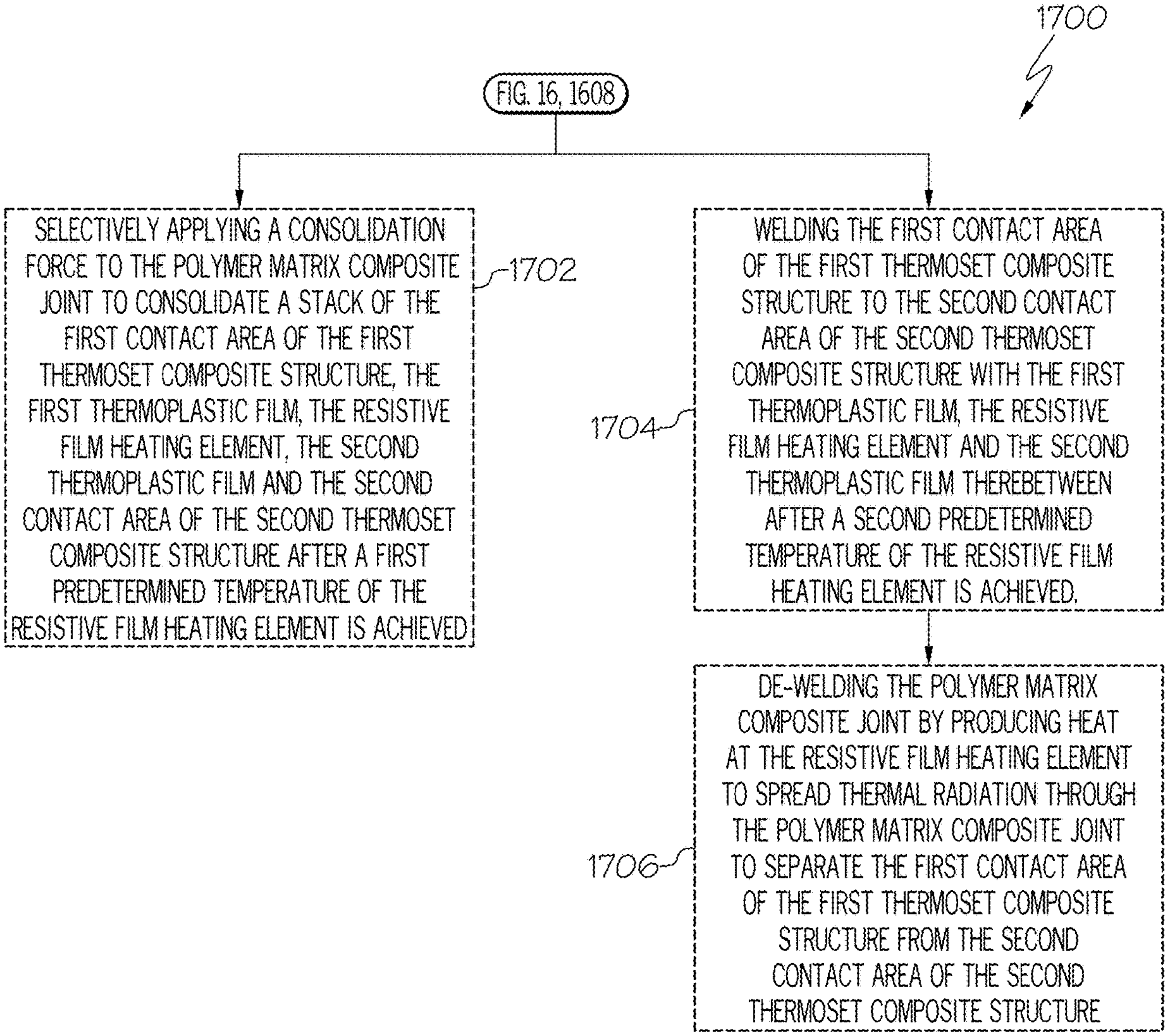
FIG. 17, in combination with FIGS. 10, 15 and 16, is a flow diagram of still another example of a method for processing a polymer matrix composite joint.
Figure 18:
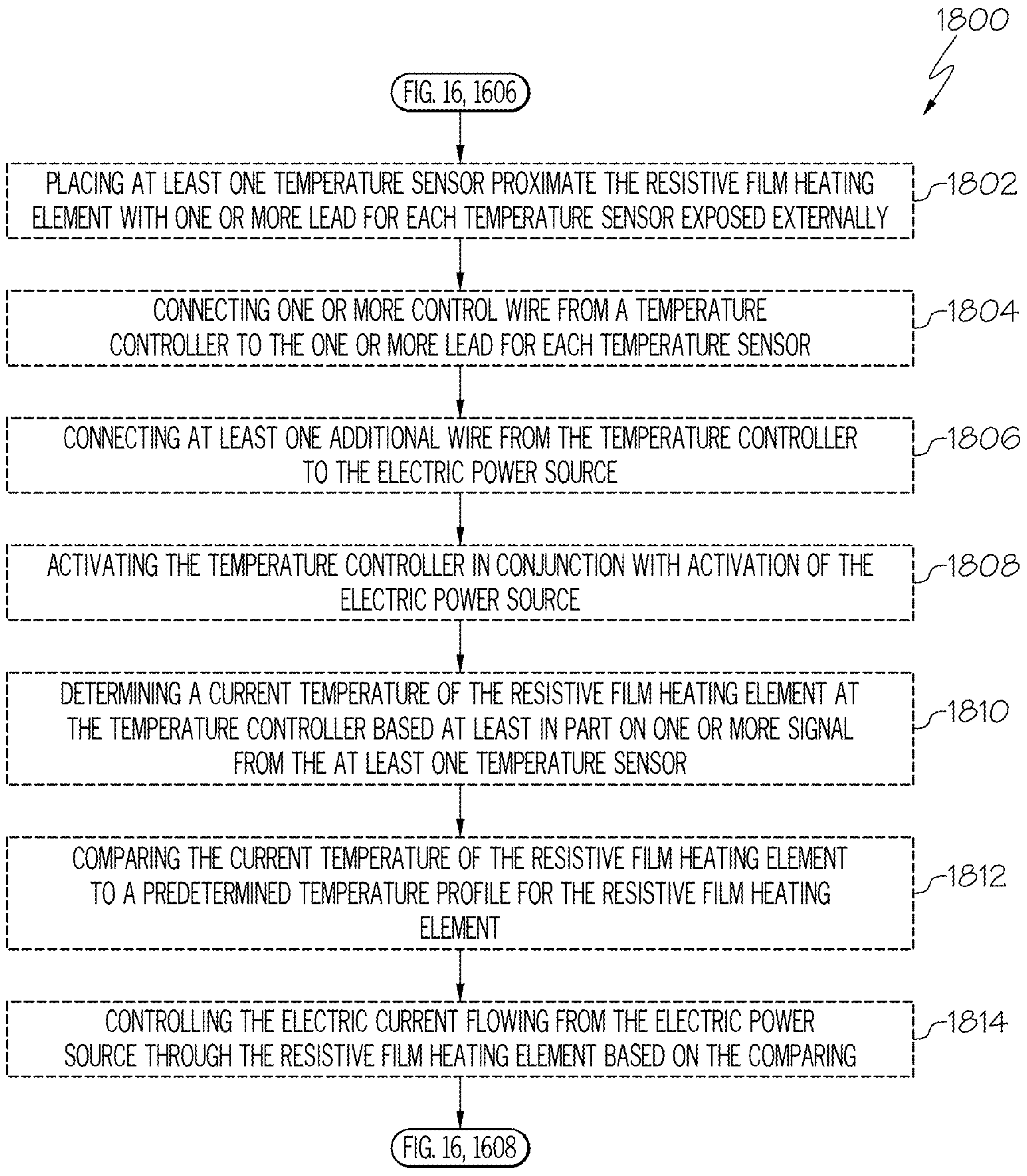
FIG. 18, in combination with FIGS. 10, 15 and 16, is a flow diagram of still yet another example of a method for processing a polymer matrix composite joint.
Figure 19:
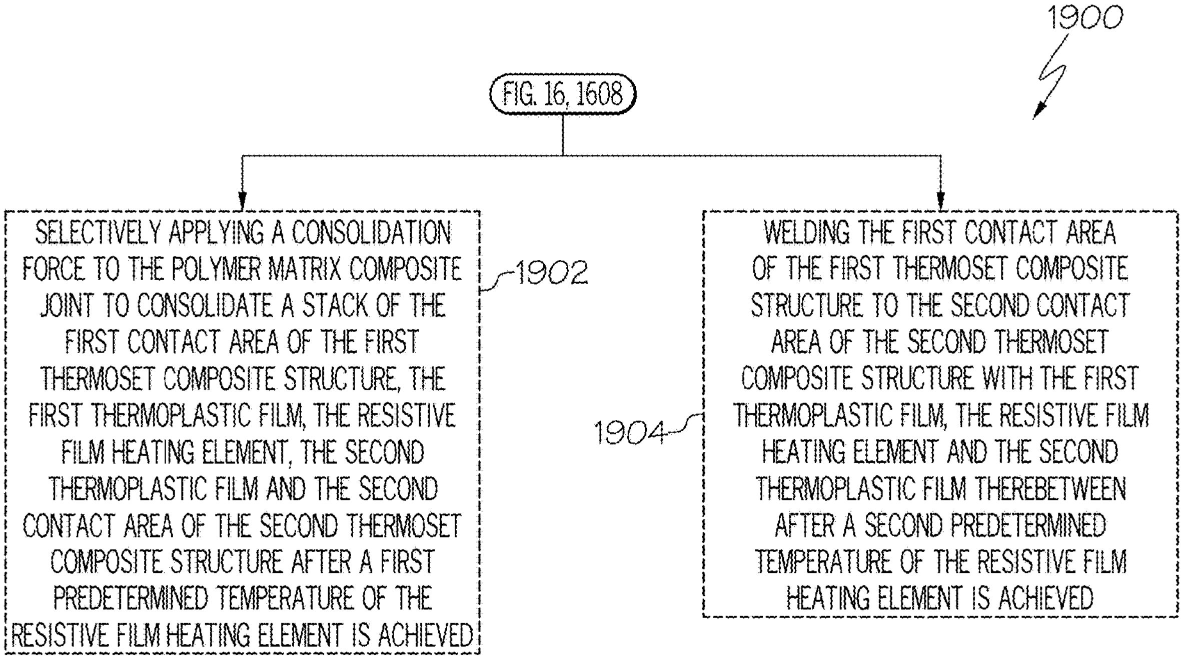
FIG. 19, in combination with FIGS. 10, 15 and 16, is a flow diagram of another example of a method for processing a polymer matrix composite joint.

FIG. 12, in combination with FIGS. 10 and 11, provides an example of the method 1200 for processing a polymer matrix composite joint 200. FIG. 13, in combination with FIGS. 10 and 11, provides an example of the method 1300 for processing a polymer matrix composite joint 200. FIG. 14, in combination with FIGS. 10 and 11, provides an example of the method 1400 for processing a polymer matrix composite joint 200. FIG. 15, in combination with FIG. 10, provides an example of the method 1500 for processing a polymer matrix composite joint 200. FIG. 16, in combination with FIGS. 10 and 15, provides an example of the method 1600 for processing a polymer matrix composite joint 200. FIG. 17, in combination with FIGS. 10, 15 and 16, provides an example of the method 1700 for processing a polymer matrix composite joint 200. FIG. 18, in combination with FIGS. 10, 15 and 16, provides an example of the method 1800 for processing a polymer matrix composite joint 200. FIG. 19, in combination with FIGS. 10, 15 and 16, provides an example of the method 1900 for processing a polymer matrix composite joint 200.

With reference again to FIGS. 2A-B and 10, in one or more example, a method 1000 (see FIG. 10) for processing a polymer matrix composite joint 200 includes identifying 1002 a first polymer matrix composite structure 204 and a second polymer matrix composite structure 208 to be joined using resistive welding. At 1004, a resistive film heating element 210 is placed on the first polymer matrix composite structure 204 over a first contact area 202 of the first polymer matrix composite structure 204. The resistive film heating element 210 includes a lignin-based carbonaceous material 212 and defines a longitudinal form. At 1006, the second polymer matrix composite structure 208 is placed on the resistive film heating element 210 such that a second contact area 206 of the second polymer matrix composite structure 208 is aligned with the first contact area 202 of the first polymer matrix composite structure 204. The first contact area 202, the resistive film heating element 210 and the second contact area 206 define a stack for the resistive welding at the polymer matrix composite joint 200.

In another example of the method 1000, the first polymer matrix composite structure 204 and the second polymer matrix composite structure 208 include a thermoplastic material. In yet another example of the method 1000, the lignin-based carbonaceous material 212 includes a lignin-based graphene material, a lignin-based graphite material, lignin-based graphene flakes, lignin-based graphite flakes or any other suitable lignin-based carbonaceous material in any suitable combination. In still another example of the method 1000, the resistive film heating element 210 also includes a composite material 302 with a polymer matrix 304. In this example, the lignin-based carbonaceous material 212 is blended with the polymer matrix 304. In still yet another example, the method 1000 also includes selectively applying 1008 a compression force to the polymer matrix composite joint 200 using at least one tool 902 to hold the stack of the first contact area 202 of the first polymer matrix composite structure 204, the resistive film heating element 210 and the second contact area 206 of the second polymer matrix composite structure 208 in place for the resistive welding. In a further example, the first contact area 202, the resistive film heating element 210 and the second contact area 206 are in intimate and continuous contact.

With reference again to FIGS. 2A-B, 6, 10 and 11, in one or more example, a method 1100 (see FIG. 11) for processing a polymer matrix composite joint 200 includes the method 1000 of FIG. 10 and continues from 1006 to 1102. In this example, the first polymer matrix composite structure 204 includes a first thermoplastic composite structure 226 with the first contact area 202 and the second polymer matrix composite structure 208 includes a second thermoplastic composite structure 228 with the second contact area 206. At 1102, a power line 606 is connected from an electric power source 604 to a first electrical connection 222 at a proximal end 218 of the resistive film heating element 210. At 1104, a return line 608 is connected from the electric power source 604 to a second electrical connection 224 at a distal end 220 of the resistive film heating element 210. At 1106, the electric power source 604 is activated to provide electrical power to the resistive film heating element 210 which causes electric current to flow through the resistive film heating element 210. At 1108, heat is produced at the resistive film heating element 210 and thermal radiation spreads through the polymer matrix composite joint 200 in response to the electric current to weld the first contact area 202 of the first thermoplastic composite structure 226 to the second contact area 206 of the second thermoplastic composite structure 228.

With reference again to FIGS. 2A-B, 6 and 9-12, in one or more example, a method 1200 (see FIG. 12) for processing a polymer matrix composite joint 200 includes the method 1000 of FIG. 10 and the method 1100 of FIG. 11 and continues from 1108 to 1202 where a consolidation force is selectively applied to the polymer matrix composite joint 200 using at least one tool 902 to consolidate the stack of the first contact area 202 of the first thermoplastic composite structure 226, the resistive film heating element 210 and the second contact area 206 of the second thermoplastic composite structure 228 after a first predetermined temperature of the resistive film heating element 210 is achieved. In another example, the method 1200 also continues from 1108 to 1204 where the first contact area 202 of the first thermoplastic composite structure 226 is welded to the second contact area 206 of the second thermoplastic composite structure 228, with the resistive film heating element 210 therebetween, after a second predetermined temperature of the resistive film heating element 210 is achieved. In a further example, the method continues from 1204 to 1206 where the polymer matrix composite joint 200 is de-welded by producing heat at the resistive film heating element 210 to spread thermal radiation through the polymer matrix composite joint 200 to separate the first contact area 202 of the first thermoplastic composite structure 226 from the second contact area 206 of the second thermoplastic composite structure 228.

With reference again to FIGS. 2A-B, 6, 10, 11 and 13, in one or more example, a method 1300 (see FIG. 13) for processing a polymer matrix composite joint 200 includes the method 1000 of FIG. 10 and the method 1100 of FIG. 11 and continues from 1106 to 1302 where at least one temperature sensor 214 is placed proximate the resistive film heating element 210 with one or more lead 216 for each temperature sensor 214 exposed externally. At 1304, one or more control wire 612 is connected from a temperature controller 610 to the one or more lead 216 for each temperature sensor 214. At 1306, at least one additional wire 614 is connected from the temperature controller 610 to the electric power source 604. At 1308, the temperature controller 610 is activated in conjunction with activation of the electric power source 604. At 1310, a current temperature of the resistive film heating element 210 is determined at the temperature controller 610 based at least in part on one or more signal from the at least one temperature sensor 214. A t1312, the current temperature of the resistive film heating element 210 is compared to a predetermined temperature profile for the resistive film heating element 210. At 1314, the electric current flowing from the electric power source 604 through the resistive film heating element 210 is controlled based on the comparing. The method 1300 continues from 1314 to 1108 of FIG. 11.

With reference again to FIGS. 2A-B, 9, 10, 11 and 14, in one or more example, a method 1400 (see FIG. 14) for processing a polymer matrix composite joint 200 includes the method 1000 of FIG. 10 and the method 1100 of FIG. 11 and continues from 1108 to 1402 where a consolidation force is selectively applied to the polymer matrix composite joint 200 using at least one tool 902 to consolidate the stack of the first contact area 202 of the first thermoplastic composite structure 226, the resistive film heating element 210 and the second contact area 206 of the second thermoplastic composite structure 228 after the current temperature of the resistive film heating element 210 reaches a desired temperature. In another example, the method continues from 1108 to 1404 where the first contact area 202 of the first thermoplastic composite structure 226 is welded to the second contact area 206 of the second thermoplastic composite structure 228, with the resistive film heating element 210 therebetween, after the current temperature of the resistive film heating element 210 reaches a desired temperature.

With reference again to FIGS. 2A-B, 5A-B, 10 and 15, in one or more example, a method 1500 (see FIG. 15) for processing a polymer matrix composite joint 200 includes the method 1000 of FIG. 10 and continues from 1006 to 1502. In this example, the first polymer matrix composite structure 204 includes a first thermoset composite structure 502 with the first contact area 202 and the second polymer matrix composite structure 208 includes a second thermoset composite structure 504 with the second contact area 206. At 1502, a first thermoplastic film 506 is placed on the first thermoset composite structure 502 over the first contact area 202. The resistive film heating element 210 being placed on the first thermoplastic film 506. At 1504, a second thermoplastic film 508 is placed on the resistive film heating element 210. The second thermoset composite structure 504 being placed on the second thermoplastic film 508 such that the second contact area 206 of the second thermoset composite structure 504 is over the second thermoplastic film 508. In another example, the method 1500 also includes selectively applying 1506 a compression force to the polymer matrix composite joint 200 to hold a stack of the first contact area 202 of the first thermoset composite structure 502, the first thermoplastic film 506, the resistive film heating element 210, the second thermoplastic film 508, and the second contact area 206 of the second thermoset composite structure 504 in place for the resistive welding.

With reference again to FIGS. 2A-B, 5A-B, 6, 10, 15 and 16, in one or more example, a method 1600 (see FIG. 16) for processing a polymer matrix composite joint 200 includes the method 1000 of FIG. 10 and the method 1500 of FIG. 15 and continues from 1504 to 1602. In this example, the longitudinal form of the resistive film heating element 210 defines a proximal end 218 and a distal end 220. At 1602, a power line 606 is connected from an electric power source 604 to a first electrical connection 222 at the proximal end 218 of the resistive film heating element 210. At 1604, a return line 608 is connected from the electric power source 604 to a second electrical connection 224 at the distal end 220 of the resistive film heating element 210. At 1606, the electric power source 604 is activated to provide electrical power to the resistive film heating element 210 which causes electric current to flow through the resistive film heating element 210. At 1608, heat is produced at the resistive film heating element 210 and thermal radiation spreads through the polymer matrix composite joint 200 in response to the electric current to weld the first contact area 202 of the first thermoset composite structure 502 to the second contact area 206 of the second thermoset composite structure 504.

With reference again to FIGS. 2A-B, 5A-B, 10 and 15-17, in one or more example, a method 1700 (see FIG. 17) for processing a polymer matrix composite joint 200 includes the method 1000 of FIG. 10, the method 1500 of FIG. 15 and the method 1600 of FIG. 16 and continues from 1608 to 1702 where a consolidation force is selectively applied to the polymer matrix composite joint 200 to consolidate a stack of the first contact area 202 of the first thermoset composite structure 502, the first thermoplastic film 506, the resistive film heating element 210, the second thermoplastic film 508 and the second contact area 206 of the second thermoset composite structure 504 after a first predetermined temperature of the resistive film heating element 210 is achieved. In another example, the method 1700 continues from 1608 to 1704 where the first contact area 202 of the first thermoset composite structure 502 is welded to the second contact area 206 of the second thermoset composite structure 504 with the first thermoplastic film 506, with the resistive film heating element 210 and the second thermoplastic film 508 therebetween, after a second predetermined temperature of the resistive film heating element 210 is achieved. In a further example, the method 1700 continues from 1704 to 1706 where the polymer matrix composite joint 200 is de-welded by producing heat at the resistive film heating element 210 to spread thermal radiation through the polymer matrix composite joint 200 to separate the first contact area 202 of the first thermoset composite structure 502 from the second contact area 206 of the second thermoset composite structure 504.

With reference again to FIGS. 2A-B, 6, 10, 15, 16 and 18, in one or more example, a method 1800 (see FIG. 18) for processing a polymer matrix composite joint 200 includes the method 1000 of FIG. 10, the method 1500 of FIG. 15 and the method 1600 of FIG. 16 and continues from 1606 to 1802 where at least one temperature sensor 214 is placed proximate the resistive film heating element 210 with one or more lead 216 for each temperature sensor 214 exposed externally. At 1804, one or more control wire 612 is connected from a temperature controller 610 to the one or more lead 216 for each temperature sensor 214. At 1806, at least one additional wire 614 is connected from the temperature controller 610 to the electric power source 604. At 1808, the temperature controller 610 is activated in conjunction with activation of the electric power source 604. At 1810, a current temperature of the resistive film heating element 210 is determined at the temperature controller 610 based at least in part on one or more signal from the at least one temperature sensor 214. At 1812, the current temperature of the resistive film heating element 210 is compared to a predetermined temperature profile for the resistive film heating element 210. At 1814, the electric current flowing from the electric power source 604 through the resistive film heating element 210 is controlled based on the comparing. The method 1800 continues from 1814 to 1608 of FIG. 16.

With reference again to FIGS. 2A-B, 5A-B, 10, 15, 16 and 19, in one or more example, a method 1900 (see FIG. 19) for processing a polymer matrix composite joint 200 includes the method 1000 of FIG. 10, the method 1500 of FIG. 15 and the method 1600 of FIG. 16 and continues from 1608 to 1802 where a consolidation force is selectively applied to the polymer matrix composite joint 200 to consolidate a stack of the first contact area 202 of the first thermoset composite structure 502, the first thermoplastic film 506, the resistive film heating element 210, the second thermoplastic film 508 and the second contact area 206 of the second thermoset composite structure 504 after a first predetermined temperature of the resistive film heating element 210 is achieved. In another example, the method 1900 also continues from 1608 of FIG. 16 to 1904 where the first contact area 202 of the first thermoset composite structure 502 is welded to the second contact area 206 of the second thermoset composite structure 504 with the first thermoplastic film 506, with the resistive film heating element 210 and the second thermoplastic film 508 therebetween, after a second predetermined temperature of the resistive film heating element 210 is achieved.

Figure 20:
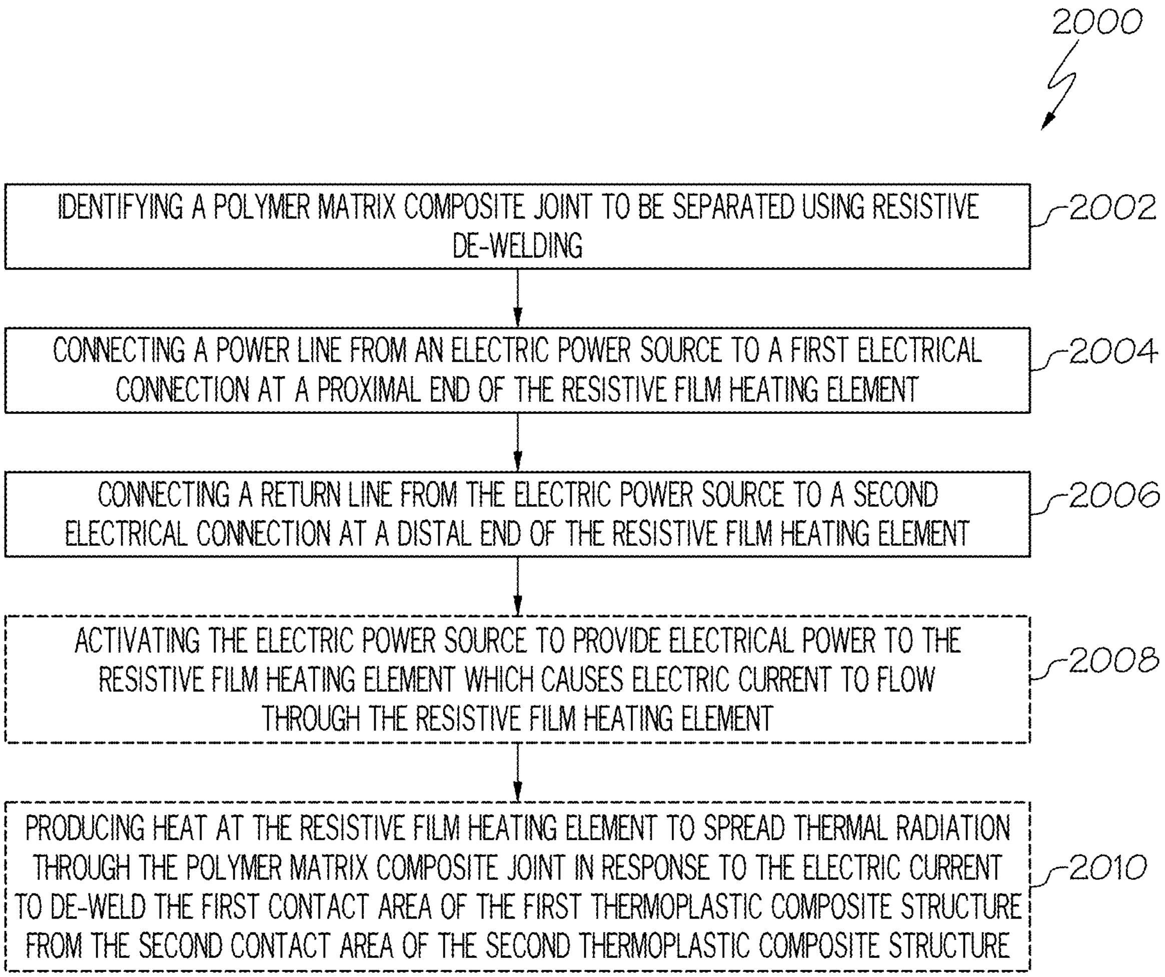
FIG. 20 is a flow diagram of an example of yet another method for processing a polymer matrix composite joint.
Figure 21:
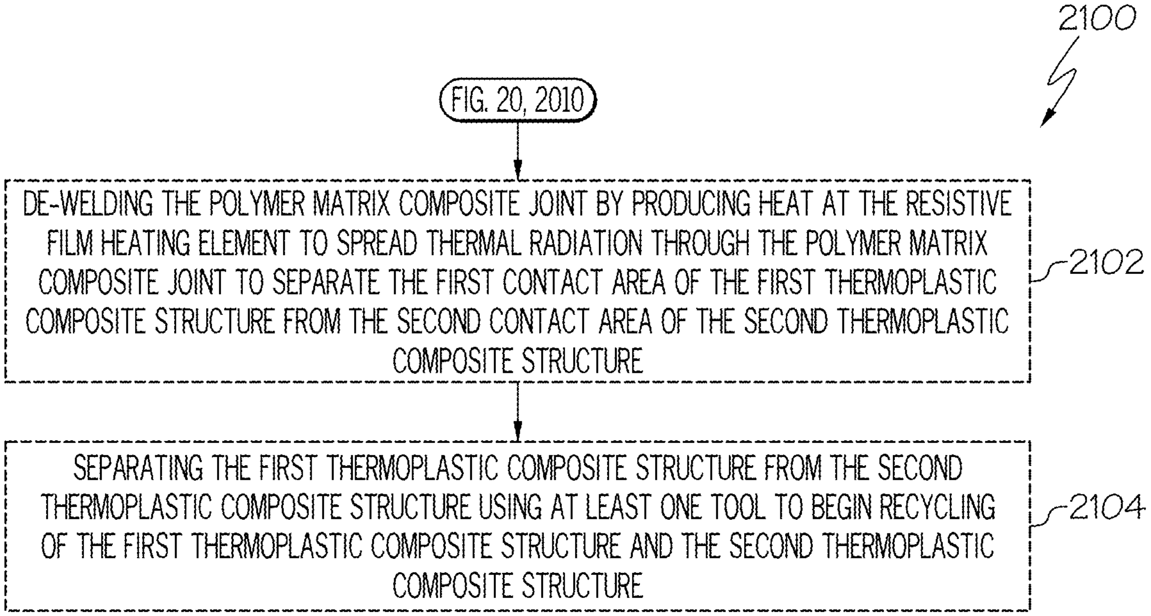
FIG. 21, in combination with FIG. 20, is a flow diagram of still another example of a method for processing a polymer matrix composite joint.
Figure 22:
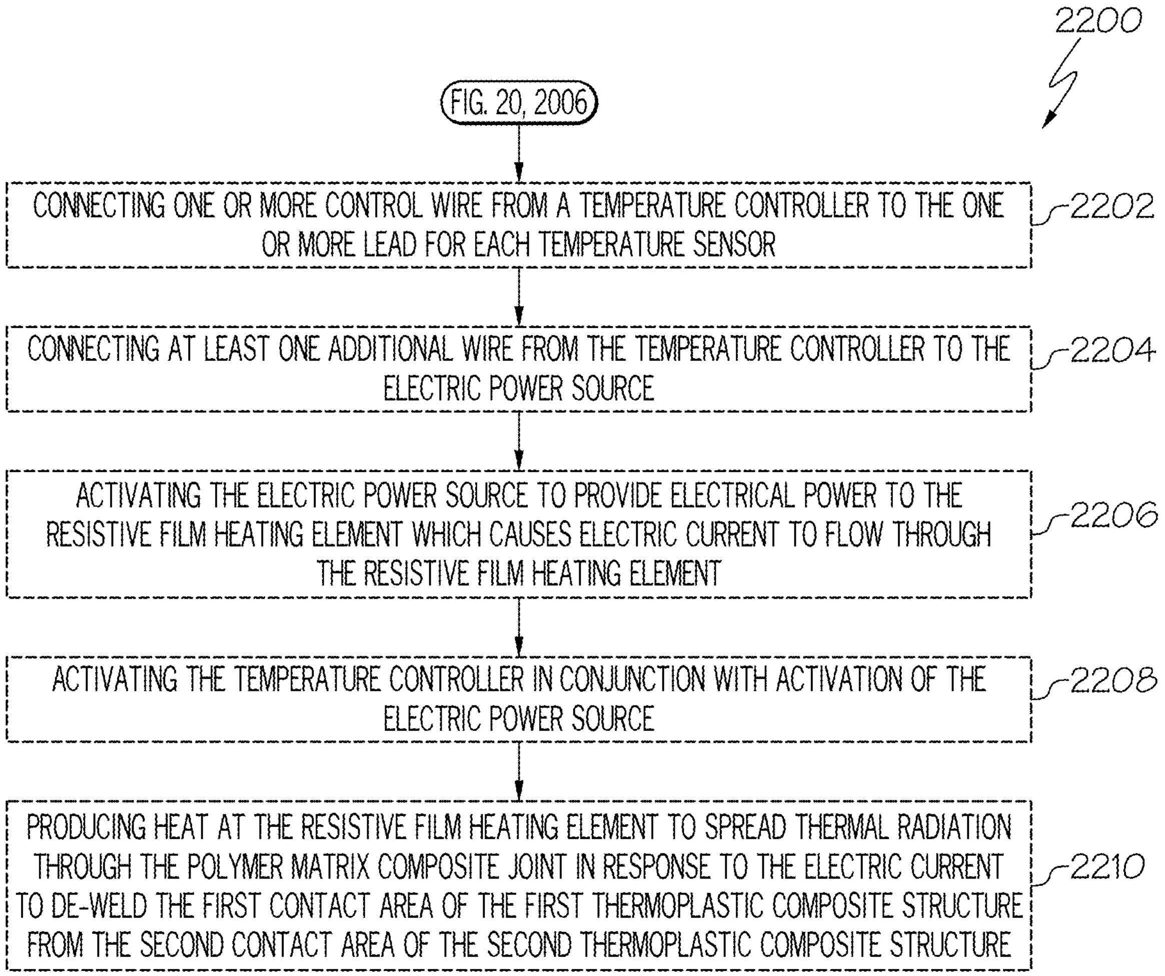
FIG. 22, in combination with FIG. 20, is a flow diagram of still yet another example of a method for processing a polymer matrix composite joint.
Figure 23:
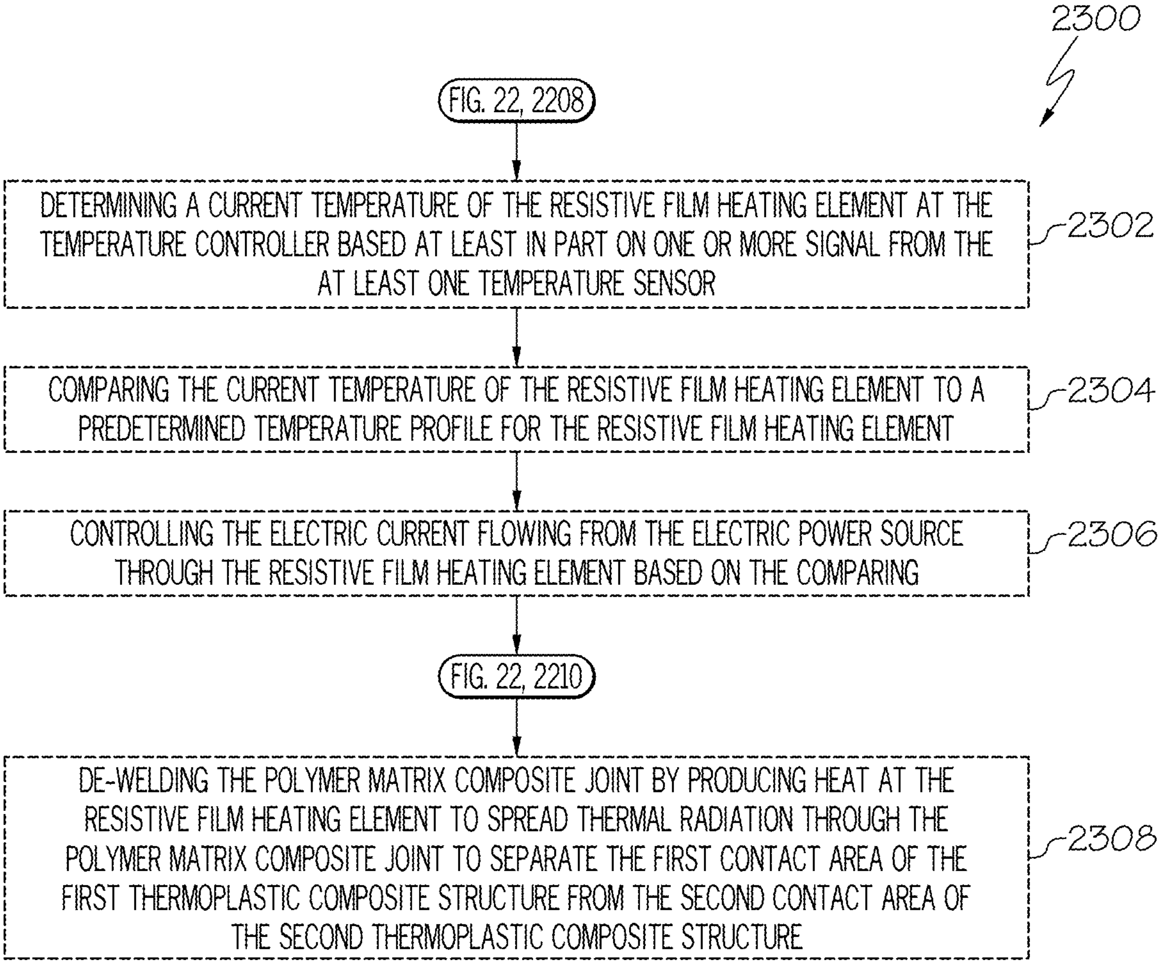
FIG. 23, in combination with FIGS. 20 and 22, is a flow diagram of another example of a method for processing a polymer matrix composite joint.
Figure 24:
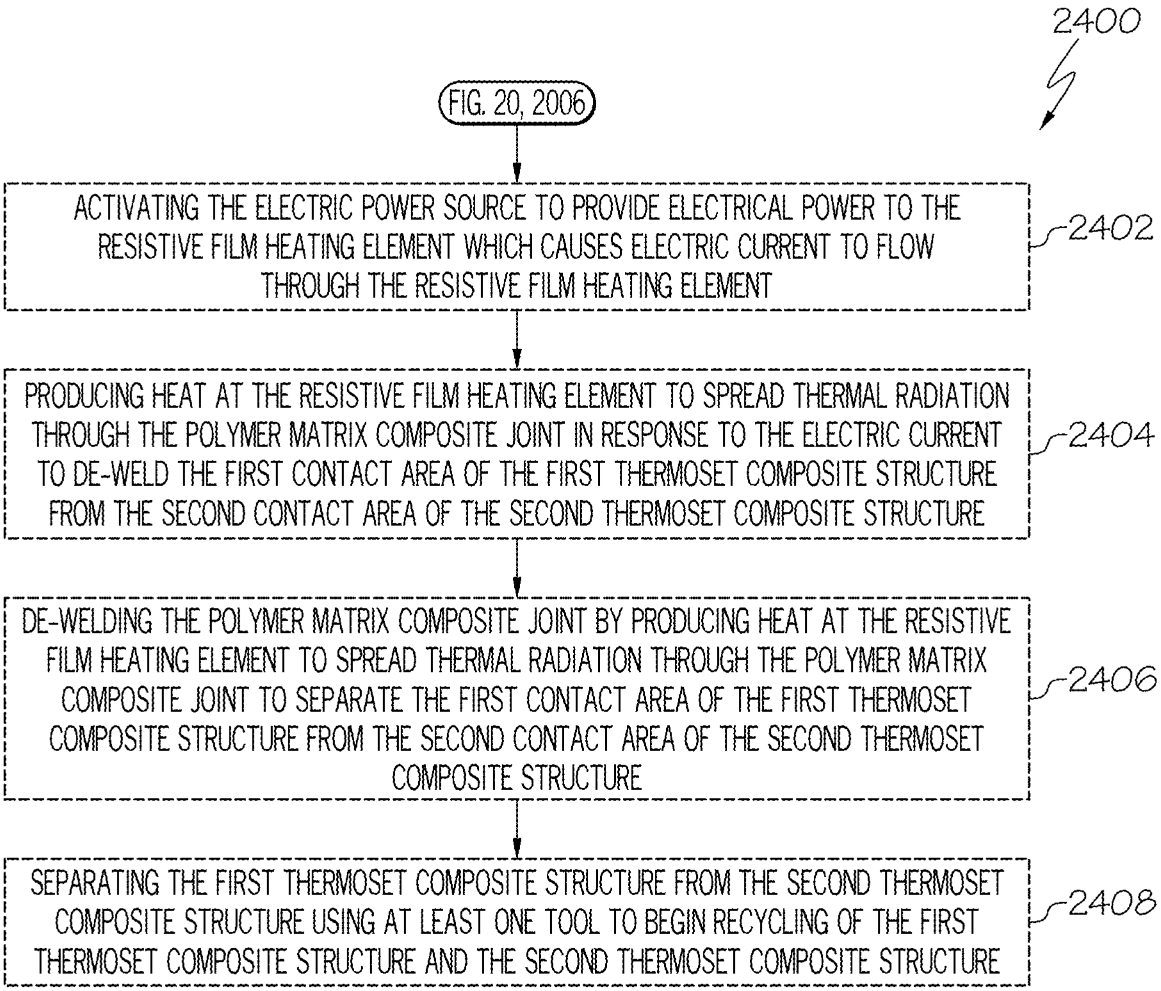
FIG. 24, in combination with FIG. 20, is a flow diagram of yet another example of a method for processing a polymer matrix composite joint.
Figure 25:
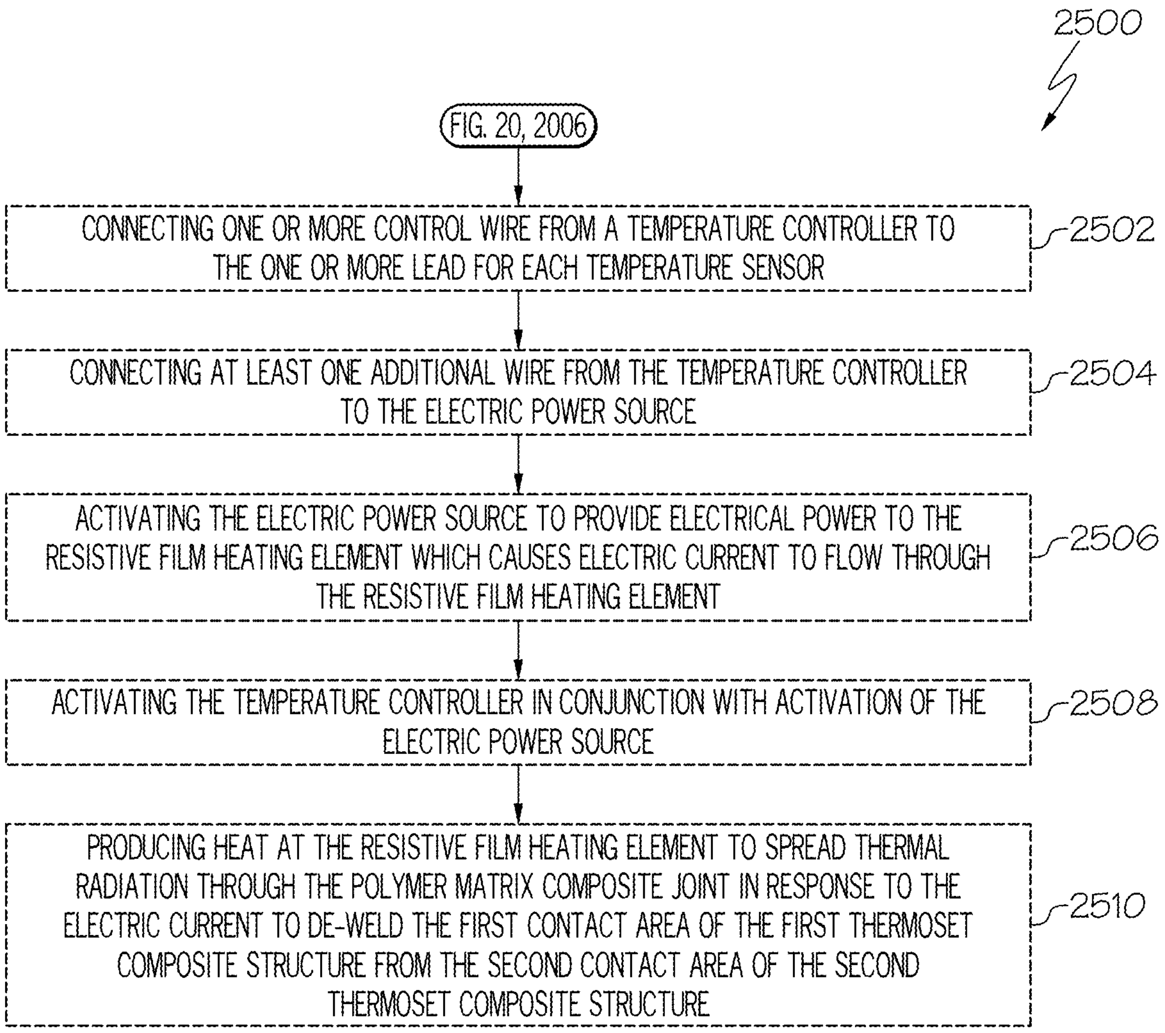
FIG. 25, in combination with FIG. 20, is a flow diagram of still another example of a method for processing a polymer matrix composite joint.
Figure 26:
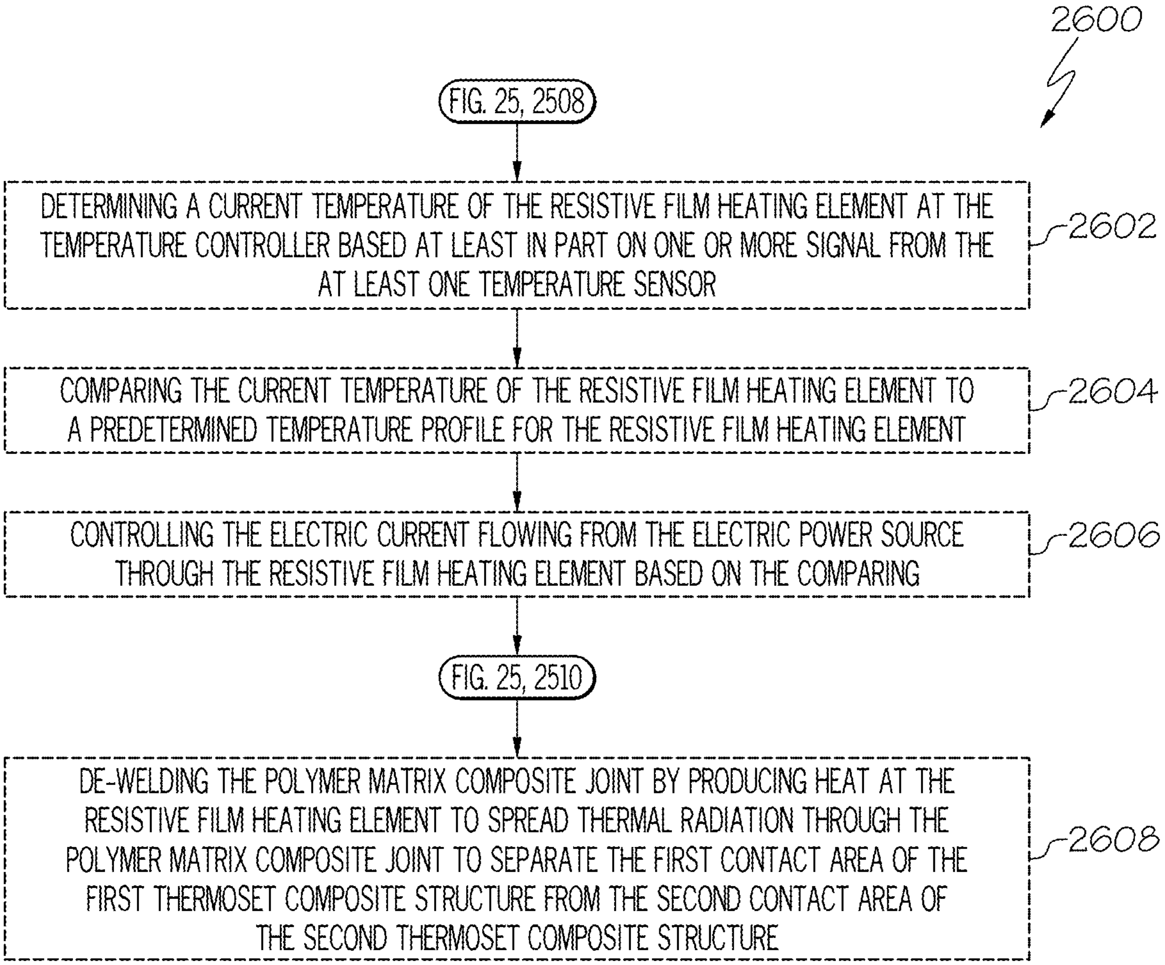
FIG. 26, in combination with FIGS. 20 and 25, is a flow diagram of still yet another example of a method for processing a polymer matrix composite joint.

Referring generally to FIGS. 2A-B, 5A-B, 6, 7 and 20-26, by way of examples, the present disclosure is directed to a method 2000, 2100, 2200, 2300, 2400, 2500, 2600 for processing a polymer matrix composite joint 200. FIG. 2A is an exploded side view of an example of the polymer matrix composite joint 200. FIG. 2B is a top view of the polymer matrix composite joint 200 of FIGS. 2A. FIG. 5A is an exploded side view of yet another example of the polymer matrix composite joint 200. FIG. 5B is a top view of the polymer matrix composite joint 200 of FIG. 5A. FIG. 6 is a functional block diagram of an example of a system 600 for processing the polymer matrix composite joint 200. FIG. 7 is a functional diagram of an example of the system 600 of FIG. 6 in which a tool 702 is used in conjunction with de-welding the polymer matrix composite joint. FIG. 20 provides an example of the method 2000 for processing a polymer matrix composite joint 200. FIG. 21, in combination with FIG. 20, provides an example of the method 2100 for processing a polymer matrix composite joint 200. FIG. 22, in combination with FIG. 20, provides an example of the method 2200 for processing a polymer matrix composite joint 200. FIG. 23, in combination with FIGS. 20 and 22, provides an example of the method 2300 for processing a polymer matrix composite joint 200. FIG. 24, in combination with FIG. 20, provides an example of the method 2400 for processing a polymer matrix composite joint 200. FIG. 25, in combination with FIG. 20, provides an example of the method 2500 for processing a polymer matrix composite joint 200. FIG. 26, in combination with FIGS. 20 and 25, provides an example of the method 2600 for processing a polymer matrix composite joint 200.

With reference again to FIGS. 2A-B, 6, and 20, in one or more example, method 2000 for processing a polymer matrix composite joint 200 includes identifying 2002 a polymer matrix composite joint 200 to be separated using resistive de-welding. In this embodiment, the polymer matrix composite joint 200 includes a first contact area 202 of a first polymer matrix composite structure 204, a second contact area 206 of a second polymer matrix composite structure 208 and a resistive film heating element 210. The resistive film heating element 210 includes a lignin-based carbonaceous material 212. The resistive film heating element 210 defines a longitudinal form and is disposed between the first contact area 202 and the second contact area 206. At 2004, a power line 606 is connected from an electric power source 604 to a first electrical connection 222 at a proximal end 218 of the resistive film heating element 210. At 2006, a return line 608 is connected from the electric power source 604 to a second electrical connection 224 at a distal end 220 of the resistive film heating element 210. In another example of the method 2000, the first polymer matrix composite structure 204 includes a first thermoplastic composite structure 226 with the first contact area 202 and the second polymer matrix composite structure 208 includes a second thermoplastic composite structure 228 with the second contact area 206. In this example, the method 2000 also includes activating 2008 the electric power source 604 to provide electrical power to the resistive film heating element 210 which causes electric current to flow through the resistive film heating element 210. At 2010, heat is produced at the resistive film heating element 210 and thermal radiation spreads through the polymer matrix composite joint (200) in response to the electric current to de-weld the first contact area (202) of the first thermoplastic composite structure (226) from the second contact area (206) of the second thermoplastic composite structure (228).

With reference again to FIGS. 2A-B, 7, 20 and 21, in one or more example, a method 2100 (see FIG. 21) for processing a polymer matrix composite joint 200 includes the method 2000 of FIG. 20 and continues from 2010 to 2102 where the polymer matrix composite joint 200 is de-welded by producing heat at the resistive film heating element 210 to spread thermal radiation through the polymer matrix composite joint 200 to separate the first contact area 202 of the first thermoplastic composite structure 226 from the second contact area 206 of the second thermoplastic composite structure 228. In another example, the method 2100 also includes separating 2104 the first thermoplastic composite structure 226 from the second thermoplastic composite structure 228 using at least one tool 702 to begin recycling of the first thermoplastic composite structure 226 and the second thermoplastic composite structure 228.

With reference again to FIGS. 2A-B, 6, 20 and 22, in one or more example, a method 2200 (see FIG. 22) for processing a polymer matrix composite joint 200 includes the method 2000 of FIG. 20 and continues from 2006 to 2202. In this example, the first polymer matrix composite structure 204 includes a first thermoplastic composite structure 226 with the first contact area 202 and the second polymer matrix composite structure 208 includes a second thermoplastic composite structure 228 with the second contact area 206. The polymer matrix composite joint 200 also includes at least one temperature sensor 214 embedded in the polymer matrix composite joint 200 proximate the resistive film heating element 210 with one or more lead 216 for each temperature sensor 214 exposed externally. At 2202, one or more control wire 612 is connected from a temperature controller 610 to the one or more lead 216 for each temperature sensor 214. At 2204, at least one additional wire 614 is connected from the temperature controller 610 to the electric power source 604. At 2206, the electric power source 604 is activated to provide electrical power to the resistive film heating element 210 which causes electric current to flow through the resistive film heating element 210. At 2208, the temperature controller 610 is activated in conjunction with activation of the electric power source 604. At 2210, heat is produced at the resistive film heating element 210 to spread thermal radiation through the polymer matrix composite joint 200 in response to the electric current to de-weld the first contact area 202 of the first thermoplastic composite structure 226 from the second contact area 206 of the second thermoplastic composite structure 228.

With reference again to FIGS. 2A-B, 6, 20, 22 and 23, in one or more example, a method 2300 (see FIG. 23) for processing a polymer matrix composite joint 200 includes the method 2000 of FIG. 20 and the method 2200 of FIG. 22 and continues from 2008 to 2302 where a current temperature of the resistive film heating element 210 is determined at the temperature controller 610 based at least in part on one or more signal from the at least one temperature sensor 214. At 2304, the current temperature of the resistive film heating element 210 is compared to a predetermined temperature profile for the resistive film heating element 210. At 2306, the electric current flowing from the electric power source 604 through the resistive film heating element 210 is controlled based on the comparing. The method 2300 continues from 2306 to 2210. In another example, the method 2300 continues from 2210 to 2308 where the polymer matrix composite joint 200 is de-welded by producing heat at the resistive film heating element 210 to spread thermal radiation through the polymer matrix composite joint 200 to separate the first contact area 202 of the first thermoplastic composite structure 226 from the second contact area 206 of the second thermoplastic composite structure 228.

With reference again to FIGS. 2A-B, 5A-B, 6, 7, 20 and 24, in one or more example, a method 2400 (see FIG. 24) for processing a polymer matrix composite joint 200 includes the method 2000 of FIG. 20 and continues from 2006 to 2402. In this example, the first polymer matrix composite structure 204 includes a first thermoset composite structure 502 with the first contact area 202 and the second polymer matrix composite structure 208 includes a second thermoset composite structure 504 with the second contact area 206. The polymer matrix composite joint 200 also includes a first thermoplastic film 506 disposed between the first contact area 202 of the first thermoset composite structure 502 and the resistive film heating element 210 and a second thermoplastic film 508 disposed between the resistive film heating element 210 and the second contact area 206 of the second thermoset composite structure 504. At 2402, the electric power source 604 is activated to provide electrical power to the resistive film heating element 210 which causes electric current to flow through the resistive film heating element 210. At 2404, heat is produced at the resistive film heating element 210 to spread thermal radiation through the polymer matrix composite joint 200 in response to the electric current to de-weld the first contact area 202 of the first thermoset composite structure 502 from the second contact area 206 of the second thermoset composite structure 504. In another example, the method 2400 also includes de-welding 2406 the polymer matrix composite joint 200 by producing heat at the resistive film heating element 210 to spread thermal radiation through the polymer matrix composite joint 200 to separate the first contact area 202 of the first thermoset composite structure 502 from the second contact area 206 of the second thermoset composite structure 504. In a further example, the method 2400 also includes separating 2408 the first thermoset composite structure 502 from the second thermoset composite structure 504 using at least one tool 702 to begin recycling of the first thermoset composite structure 502 and the second thermoset composite structure 504.

With reference again to FIGS. 2A-B, 5A-B, 6, 20 and 25, in one or more example, a method 2500 (see FIG. 25) for processing a polymer matrix composite joint 200 includes the method 2000 of FIG. 20 and continues from 2006 to 2502. In this example, the polymer matrix composite joint 200 also includes at least one temperature sensor 214 embedded in the polymer matrix composite joint 200 proximate the resistive film heating element 210 with one or more lead 216 for each temperature sensor 214 exposed externally. At 2502, one or more control wire 612 is connected from a temperature controller 610 to the one or more lead 216 for each temperature sensor 214. At 2504, at least one additional wire 614 is connected from the temperature controller 610 to the electric power source 604. At 2506, the electric power source 604 is activated to provide electrical power to the resistive film heating element 210 which causes electric current to flow through the resistive film heating element 210. At 2508, the temperature controller 610 is activated in conjunction with activation of the electric power source 604. At 2510, heat is produced at the resistive film heating element 210 to spread thermal radiation through the polymer matrix composite joint 200 in response to the electric current to de-weld the first contact area 202 of the first thermoset composite structure 502 from the second contact area 206 of the second thermoset composite structure 504.

With reference again to FIGS. 2A-B, 5A-B, 6, 20, 25 and 26, in one or more example, a method 2600 (see FIG. 26) for processing a polymer matrix composite joint 200 includes the method 2000 of FIG. 20 and the method 2500 of FIG. 25 and continues from 2508 to 2602 where a current temperature of the resistive film heating element 210 is determined at the temperature controller 610 based at least in part on one or more signal from the at least one temperature sensor 214. At 2604, the current temperature of the resistive film heating element 210 is compared to a predetermined temperature profile for the resistive film heating element 210. At 2606, the electric current flowing from the electric power source 604 through the resistive film heating element 210 is controlled based on the comparing. The method 2600 continues from 2606 to 2510 of FIG. 25. In another example, the method 2600 continues from 2510 to 2608 where the polymer matrix composite joint 200 is de-welded by producing heat at the resistive film heating element 210 to spread thermal radiation through the polymer matrix composite joint 200 to separate the first contact area 202 of the first thermoset composite structure 502 from the second contact area 206 of the second thermoset composite structure 504.

Examples of polymer matrix composite joints 200, systems 600, 800 for processing of polymer matrix composite joints 200 and methods 1100, 1200, 1300, 1400, 1500, 1600, 1700, 1800, 1900, 2000, 2100, 2200, 2300, 2400, 2500, 2600 for processing of polymer matrix composite joints 200 may be related to or used in the context of aircraft manufacturing. Although an aircraft example is described, the examples and principles disclosed herein may be applied to other products in the aerospace industry and other industries, such as the automotive industry, the space industry, the construction industry and other design and manufacturing industries. Accordingly, in addition to aircraft, the examples and principles disclosed herein may apply to the use of various products in the manufacture of various types of vehicles and in the construction of various types of buildings.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic and/or operational step described in connection with the example is included in at least one aspect, embodiment and/or implementation of the subject matter according to the present disclosure. Thus, the phrases "an example," "another example," "one or more example," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc., are used herein merely as labels and are not intended to impose ordinal, positional, or hierarchical requirements on the items to which these terms refer. Moreover, reference to, e.g., a "second" item does not require or preclude the existence of, e.g., a "first" or lower-numbered item and/or, e.g., a "third" or higher-numbered item.

As used herein, the phrase "at least one of," when used with a list of items, means different combinations of one or more of the listed items may be used and only one of each item in the list may be needed. For example, "at least one of item A, item B and item C" may include, without limitation, item A or item A and item B. This example also may include item A, item B and item C or item B and item C. In other examples, "at least one of" may be, for example, without limitation, two of item A, one of item B and ten of item C; four of item B and seven of item C; and other suitable combinations. As used herein, the term "and/or" and the "/" symbol includes any and all combinations of one or more of the associated listed items.

As used herein, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIGS. 1, 2A-B, 3, 4A-B, 5A-B and 6-9, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features and/or components described and illustrated in FIGS. 1, 2A-B, 3, 4A-B, 5A-B and 6-9, referred to above, need be included in every example and not all elements, features and/or components described herein are necessarily depicted in each illustrative example. Accordingly, some of the elements, features and/or components described and illustrated in FIGS. 1, 2A-B, 3, 4A-B, 5A-B and 6-9 may be combined in various ways without the need to include other features described and illustrated in FIGS. 1, 2A-B, 3, 4A-B, 5A-B and 6-9, other drawing figures and/or the accompanying disclosure, even though such combination or combinations are not explicitly illustrated herein. Similarly, additional features not limited to the examples presented, may be combined with some or all the features shown and described herein. Unless otherwise explicitly stated, the schematic illustrations of the examples depicted in FIGS. 1, 2A-B, 3, 4A-B, 5A-B and 6-9, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features and/or components that serve a similar, or at least substantially similar, purpose are labeled with like numbers in each of FIGS. 1, 2A-B, 3, 4A-B, 5A-B and 6-9 and such elements, features and/or components may not be discussed in detail herein with reference to each of FIGS. 1, 2A-B, 3, 4A-B, 5A-B and 6-9. Similarly, all elements, features and/or components may not be labeled in each of FIGS. 1, 2A-B, 3, 4A-B, 5A-B and 6-9, but reference numerals associated therewith may be utilized herein for consistency.

In FIGS. 10-26, referred to above, the blocks may represent operations, steps and/or portions thereof, and lines connecting the various blocks do not imply any particular order or dependency of the operations or portions thereof. It will be understood that not all dependencies among the various disclosed operations are necessarily represented. FIGS. 10-26 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages and similar language used throughout the present disclosure may, but does not necessarily, refer to the same example.

Figure 27:
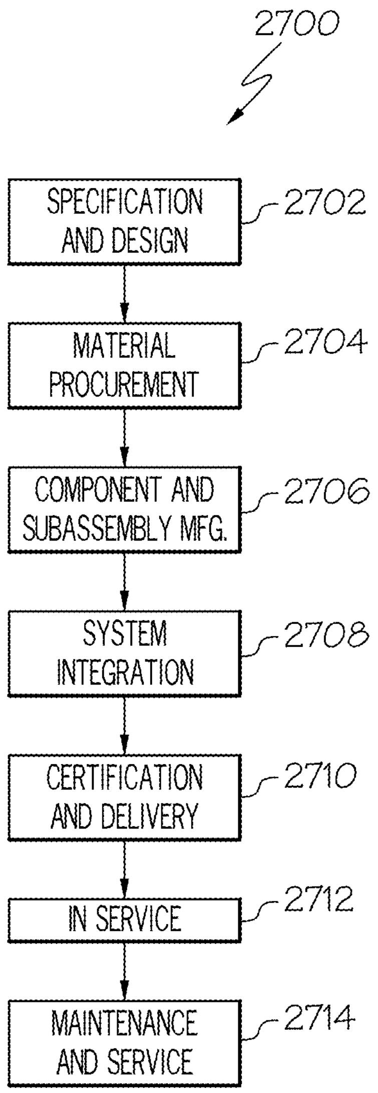
FIG. 27 is a block diagram of aircraft production and service methodology that implements polymer matrix composite joints fabricated using one or more of the examples of systems and methods for processing a polymer matrix composite joints disclosed herein.
Figure 28:
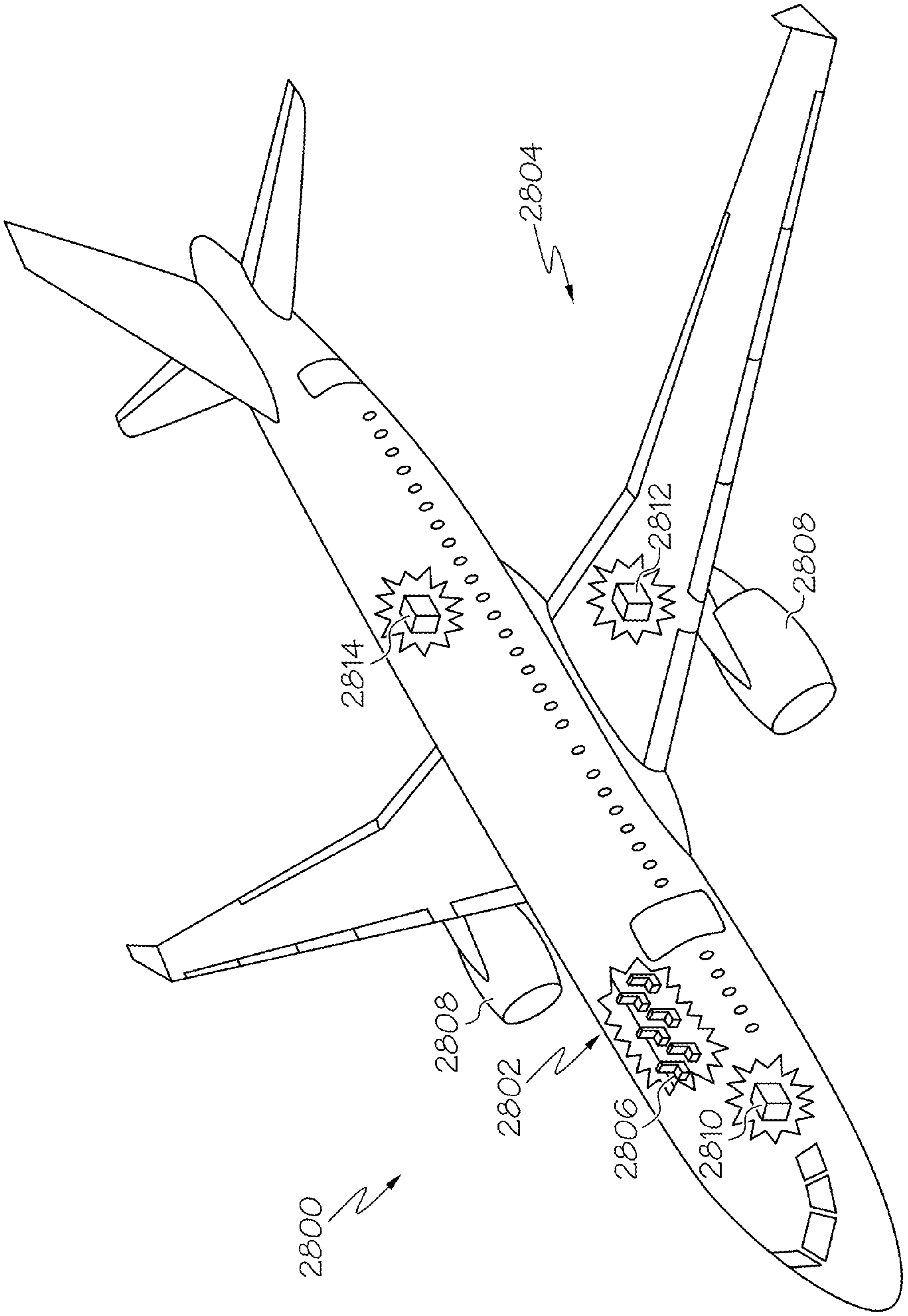
FIG. 28 is a schematic illustration of an aircraft that incorporates polymer matrix composite joints fabricated using one or more of the examples of systems and methods for processing a polymer matrix composite joints disclosed herein.

Examples of the subject matter disclosed herein may be described in the context of aircraft manufacturing and service method 2700 as shown in FIG. 27 and aircraft 2800 as shown in FIG. 28. In one or more example, the disclosed polymer matrix composite joints 200, systems 600, 800 for processing of polymer matrix composite joints 200 and methods 1100, 1200, 1300, 1400, 1500, 1600, 1700, 1800, 1900, 2000, 2100, 2200, 2300, 2400, 2500, 2600 for processing of polymer matrix composite joints 200 may be used in aircraft manufacturing. During pre-production, the service method 2700 may include specification and design (block 2702) of aircraft 2800 and material procurement (block 2704). During production, component and subassembly manufacturing (block 2706) and system integration (block 2708) of aircraft 2800 may take place. Thereafter, aircraft 2800 may go through certification and delivery (block 2710) to be placed in service (block 2712). While in service, aircraft 2800 may be scheduled for routine maintenance and service (block 2714). Routine maintenance and service may include modification, reconfiguration, refurbishment, etc. of one or more systems of aircraft 2800.

Each of the processes of the service method 2700 may be performed or carried out by a system integrator, a third party and/or an operator (e.g., a customer). For the purposes of this description, a system integrator may include, without limitation, any number of aircraft manufacturers and major-system subcontractors; a third party may include, without limitation, any number of vendors, subcontractors and suppliers; and an operator may be an airline, leasing company, military entity, service organization and so on.

As shown in FIG. 28, aircraft 2800 produced by the service method 2700 may include airframe 2802 with a plurality of high-level systems 2804 and interior 2806. Examples of high-level systems 2804 include one or more of propulsion system 2808, electrical system 2810, hydraulic system 2812 and environmental system 2814. Any number of other systems may be included. Although an aerospace example is shown, the principles disclosed herein may be applied to other industries, such as the automotive industry. Accordingly, in addition to aircraft 2800, the principles disclosed herein may apply to other vehicles, e.g., land vehicles, marine vehicles, space vehicles, etc.

The disclosed polymer matrix composite joints 200, systems 600, 800 for processing of polymer matrix composite joints 200 and methods 1100, 1200, 1300, 1400, 1500, 1600, 1700, 1800, 1900, 2000, 2100, 2200, 2300, 2400, 2500, 2600 for processing of polymer matrix composite joints 200 may be employed during any one or more of the stages of the manufacturing and service method 2700. For example, components or subassemblies corresponding to component and subassembly manufacturing (block 2706) may be fabricated or manufactured in a manner similar to components or subassemblies produced while aircraft 2800 is in service (block 2712). Also, one or more example of the system(s), method(s), or combination thereof may be utilized during production stages (block 2706 and block 2708), for example, by substantially expediting assembly of or reducing the cost of aircraft 2800. Similarly, one or more example of the system or method realizations, or a combination thereof, may be utilized, for example and without limitation, while aircraft 2800 is in service (block 2712) and/or during maintenance and service (block 2714).

The described features, advantages and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, various examples of the polymer matrix composite joints 200, systems 600, 800 for processing of polymer matrix composite joints 200 and methods 1100, 1200, 1300, 1400, 1500, 1600, 1700, 1800, 1900, 2000, 2100, 2200, 2300, 2400, 2500, 2600 for processing of polymer matrix composite joints 200 have been shown and described, modifications may occur to those skilled in the art upon reading the specification. The present application includes such modifications and is limited only by the scope of the claims.

What is claimed is:

1. A polymer matrix composite joint, comprising:

a first contact area of a first polymer matrix composite structure;

a second contact area of a second polymer matrix composite structure, the second contact area sized and shaped based on the first contact area; and a resistive film heating element comprising a lignin-based carbonaceous material, the resistive film heating element defining a longitudinal form and disposed between the first contact area and the second contact area, the resistive film heating element sized and shaped based on the first contact area and the second contact area, the resistive film heating element for joining the first polymer matrix composite structure and the second polymer matrix composite structure at the first contact area and the second contact area using a resistive welding process.

2. The polymer matrix composite joint of claim 1 wherein the longitudinal form of the resistive film heating element defines a proximal end and a distal end, the polymer matrix composite joint further comprising:

a first electrical connection at the proximal end of the resistive film heating element for receiving a power line from an electric power source; and a second electrical connection at the distal end of the resistive film heating element for receiving a return line from the electric power source.

3. The polymer matrix composite joint of claim 2, wherein the first electrical connection and the second electrical connection are comprised of at least one of a copper material, a copper alloy material, a copper mesh material, an aluminum material and an aluminum alloy material.

4. The polymer matrix composite joint of claim 2, wherein the electric power source comprises a direct current power source.

5. A system for processing a polymer matrix composite joint, comprising:

a polymer matrix composite workpiece comprising the polymer matrix composite joint of claim 2; and the electric power source with a power line connected to the first electrical connection and a return line connected to the second electrical connection.

6. The polymer matrix composite joint of claim 1 wherein a length of the resistive film heating element comprises a maximum length based on electrical conductivity properties of the resistive film heating element and a desired electric current through the resistive film heating element.

7. The polymer matrix composite joint of claim 6 wherein, where lengths of the first polymer matrix composite structure and the second polymer matrix composite structure exceed the maximum length of the resistive film heating element, additional resistive film heating elements are used to form additional polymer matrix composite joints to fully join the first polymer matrix composite structure and the second polymer matrix composite structure.

8. The polymer matrix composite joint of claim 1 wherein the first polymer matrix composite structure comprises a first thermoset composite structure with the first contact area and the second polymer matrix composite structure comprises a second thermoset composite structure with the second contact area, the polymer matrix composite joint further comprising;

a first thermoplastic film disposed between the first contact area of the first thermoset composite structure and the resistive film heating element, the first thermoplastic film sized and shaped based on the first contact area and the resistive film heating element; and a second thermoplastic film disposed between the resistive film heating element and the second contact area of the second thermoset composite structure, the second thermoplastic film sized and shaped based on the resistive film heating element and the second contact area.

9. The polymer matrix composite joint of claim 8 wherein the first thermoplastic film and the second thermoplastic film comprise a thickness of approximately 20 μm to approximately 100 μm.

10. The polymer matrix composite joint of claim 1 wherein the first polymer matrix composite structure and the second polymer matrix composite structure comprise a thermoplastic material.

11. The polymer matrix composite joint of claim 1 wherein the lignin-based carbonaceous material comprises at least one of a lignin-based graphene material, a lignin-based graphite material, lignin-based graphene flakes and lignin-based graphite flakes.

12. The polymer matrix composite joint of claim 1 wherein the resistive film heating element further comprises a composite material with a polymer matrix, the lignin-based carbonaceous material blended with the polymer matrix.

13. The polymer matrix composite joint of claim 1 wherein the first contact area, the resistive film heating element and the second contact area are in intimate and continuous contact.

14. The polymer matrix composite joint of claim 1 wherein the first contact area, the resistive film heating element and the second contact area are joined by autohesion in conjunction with the resistive welding process.

15. The polymer matrix composite joint of claim 1 wherein the first contact area, the resistive film heating element and the second contact area are joined by creating entanglements between polymer chains of the first contact area and the second contact area in conjunction with the resistive welding process.

16. The polymer matrix composite joint of claim 1 wherein the first contact area, the resistive film heating element and the second contact area are joined by molecular diffusion of polymer chains of the first contact area and the second contact area in conjunction with the resistive welding process.

17. The polymer matrix composite joint of claim 1, further comprising:

at least one temperature sensor embedded in the polymer matrix composite joint proximate the resistive film heating element with one or more lead for each temperature sensor exposed externally for connection with a temperature controller.

18. A system for processing a polymer matrix composite joint, comprising:

a polymer matrix composite workpiece comprising the polymer matrix composite joint of claim 1.

19. A method for processing a polymer matrix composite joint, comprising:

identifying a first polymer matrix composite structure and a second polymer matrix composite structure to be joined using resistive welding;

placing a resistive film heating element on the first polymer matrix composite structure over a first contact area of the first polymer matrix composite structure, the resistive film heating element comprising a lignin-based carbonaceous material and defining a longitudinal form; and placing the second polymer matrix composite structure on the resistive film heating element such that a second contact area of the second polymer matrix composite structure is aligned with the first contact area of the first polymer matrix composite structure, the first contact area, the resistive film heating element and the second contact area defining a stack for the resistive welding at the polymer matrix composite joint.

20. A method for processing a polymer matrix composite joint, comprising:

identifying a polymer matrix composite joint to be separated using resistive de-welding, the polymer matrix composite joint comprising a first contact area of a first polymer matrix composite structure, a second contact area of a second polymer matrix composite structure, and a resistive film heating element comprising a lignin-based carbonaceous material, the resistive film heating element defining a longitudinal form and disposed between the first contact area and the second contact area;

connecting a power line from an electric power source to a first electrical connection at a proximal end of the resistive film heating element; and connecting a return line from the electric power source to a second electrical connection at a distal end of the resistive film heating element.

* * * * *